United States Patent
Mini Townson et al.

(10) Patent No.: US 10,834,985 B2
(45) Date of Patent: Nov. 17, 2020

(54) MECHANICALLY-ACTIVATED SHOCK ABATEMENT SYSTEM AND METHOD

(71) Applicant: Titon Corp., Guatemala (GT)

(72) Inventors: Juan Francisco Javier Mini Townson, Guatemala (GT); José Rodrigo Aragón Cabrera, Santa Catarina Pinula (GT); Juan Pablo Alfaro Samayoa, Guatemala (GT)

(73) Assignee: TITON IDEAS, INC., Guatemala (GT)

( * ) Notice: Subject to any disclaimer, the term of this patent is extended or adjusted under 35 U.S.C. 154(b) by 383 days.

(21) Appl. No.: 15/380,907

(22) Filed: Dec. 15, 2016

(65) Prior Publication Data

US 2018/0042326 A1   Feb. 15, 2018

Related U.S. Application Data

(60) Provisional application No. 62/375,240, filed on Aug. 15, 2016.

(51) Int. Cl.
| | |
|---|---|
| A42B 3/04 | (2006.01) |
| A42B 3/06 | (2006.01) |
| A42B 3/14 | (2006.01) |
| A42B 3/12 | (2006.01) |
| A42B 3/00 | (2006.01) |

(52) U.S. Cl.
CPC .............. *A42B 3/046* (2013.01); *A42B 3/063* (2013.01); *A42B 3/064* (2013.01); *A42B 3/125* (2013.01); *A42B 3/14* (2013.01)

(58) Field of Classification Search
CPC ......... A42B 3/046; A42B 3/064; A42B 3/063; A42B 3/12; A42B 3/125; A42B 3/127; A42B 3/121; A42B 3/14; A42B 3/0486; A42B 3/06; A42B 3/062; A42B 3/128; F16F 13/005
See application file for complete search history.

(56) References Cited

U.S. PATENT DOCUMENTS 2,295,855 A   9/1942 Ludwell et al.
2,753,562 A   7/1956 McDonald et al.
(Continued)

OTHER PUBLICATIONS

Foster, Tom , "The Helmet That Can Save Football", Popular Science, Dec. 18, 2012, 10 pages.
(Continued)

*Primary Examiner* — Amy Vanatta
(74) *Attorney, Agent, or Firm* — Danielson Legal LLC

(57) ABSTRACT

Aspects of the subject disclosure may include, for example, a process in which a helmet system including a machine is provided, that when worn by a user, positions the machine in a proximate relationship to a head portion, a neck portion, or both of the user. The helmet system provides a redistributing of a force responsive to a collision received along a first direction, wherein the force results from kinetic energy of an impact encountered at an external surface of the helmet system. The force induces an actuation of the machine, wherein the redistributing of the received collision force is based on the actuation of the machine. Energy transferred to the head portion, the neck portion, or both, resulting from the kinetic energy of the impact, is reduced, e.g., absorbed, based on the actuation of the machine. Other embodiments are disclosed.

20 Claims, 23 Drawing Sheets

(56) References Cited

U.S. PATENT DOCUMENTS

| | | | |
|---|---|---|---|
| 2,870,445 A | 1/1959 | Fisher et al. | |
| 2,879,513 A | 3/1959 | Fisher et al. | |
| 2,921,318 A | 1/1960 | Theodore et al. | |
| 3,054,111 A | 9/1962 | Austin et al. | |
| 3,790,150 A | 2/1974 | Lippert | |
| 4,012,794 A | 3/1977 | Nomiyama et al. | |
| 4,032,127 A | 6/1977 | Lipfert et al. | |
| 4,033,567 A | 7/1977 | Lipfert et al. | |
| 4,283,864 A | 8/1981 | Lipfert et al. | |
| 4,290,149 A | 9/1981 | Aileo et al. | |
| 4,347,840 A | 9/1982 | Adams et al. | |
| 4,407,021 A | 10/1983 | Kralik et al. | |
| 4,535,553 A | 8/1985 | Derderian et al. | |
| 4,625,487 A | 12/1986 | Blakeway et al. | |
| 4,665,569 A | 5/1987 | Santini et al. | |
| 4,942,628 A | 7/1990 | Freund et al. | |
| 4,972,527 A | 11/1990 | Wallace et al. | |
| 5,319,808 A | 6/1994 | Bishop et al. | |
| 5,581,816 A | 12/1996 | Davis et al. | |
| 5,742,937 A | 4/1998 | Baudou et al. | |
| 6,798,392 B2 | 9/2004 | Hartwell et al. | |
| 7,370,842 B2 | 5/2008 | Fritz et al. | |
| 7,603,725 B2 | 10/2009 | Harris et al. | |
| 8,127,373 B1 * | 3/2012 | Fodemski | A42B 3/121 |
| | | | 2/413 |
| 8,316,512 B2 | 11/2012 | Halldin | |
| 8,615,817 B2 | 12/2013 | Phillips | |
| 8,691,370 B2 | 4/2014 | Brill et al. | |
| 8,713,716 B2 * | 5/2014 | Krueger | A41D 13/0002 |
| | | | 2/412 |
| 8,881,315 B2 | 11/2014 | Crelinsten et al. | |
| 8,955,169 B2 | 2/2015 | Reisinger et al. | |
| 9,179,727 B2 | 11/2015 | Grant | |
| 9,273,827 B1 * | 3/2016 | Johnson | A63B 71/10 |
| 9,314,063 B2 | 4/2016 | Ide et al. | |
| 9,316,282 B1 | 4/2016 | Harris | |
| 9,596,901 B1 * | 3/2017 | Anvari | G05B 1/01 |
| 2002/0000004 A1 | 1/2002 | Wise et al. | |
| 2005/0268383 A1 | 12/2005 | Harris et al. | |
| 2006/0191403 A1 | 8/2006 | Hawkins et al. | |
| 2008/0028501 A1 | 2/2008 | Schimpf et al. | |
| 2008/0250547 A1 | 10/2008 | Frank et al. | |
| 2009/0260133 A1 | 10/2009 | Del et al. | |
| 2010/0229287 A1 | 9/2010 | Mothaffar et al. | |
| 2011/0185481 A1 | 8/2011 | Nagely et al. | |
| 2012/0198604 A1 | 8/2012 | Weber et al. | |
| 2013/0031706 A1 | 2/2013 | Cooksey et al. | |
| 2013/0125296 A1 * | 5/2013 | Rabinovitch | A63B 24/00 |
| | | | 2/413 |
| 2013/0212783 A1 | 8/2013 | Bonin et al. | |
| 2014/0096311 A1 | 4/2014 | Halldin et al. | |
| 2014/0101828 A1 | 4/2014 | Sugerman et al. | |
| 2014/0109299 A1 | 4/2014 | Kwan et al. | |
| 2014/0173810 A1 | 6/2014 | Suddaby et al. | |
| 2014/0215694 A1 | 8/2014 | Grice et al. | |
| 2014/0223644 A1 | 8/2014 | Bologna et al. | |
| 2014/0223646 A1 | 8/2014 | Bologna et al. | |
| 2015/0021213 A1 | 1/2015 | Rapoport | |
| 2015/0047109 A1 | 2/2015 | Grant | |
| 2015/0143617 A1 | 5/2015 | Suddaby | |
| 2015/0157080 A1 | 6/2015 | Camarillo et al. | |
| 2015/0164172 A1 * | 6/2015 | Linares | A42B 3/064 |
| | | | 2/411 |
| 2015/0223543 A1 | 8/2015 | Hernandez et al. | |
| 2015/0285697 A1 | 10/2015 | O'Bier, II | |
| 2015/0313305 A1 | 11/2015 | Daetwyler | |
| 2015/0359285 A1 | 12/2015 | Rennaker, II | |
| 2016/0073723 A1 | 3/2016 | Halldin et al. | |
| 2016/0113347 A1 | 4/2016 | Halldin | |
| 2016/0228758 A1 | 8/2016 | Bologna et al. | |
| 2016/0270472 A1 * | 9/2016 | Allen | A41D 13/018 |
| 2017/0006952 A1 * | 1/2017 | Staton | A42B 3/046 |
| 2017/0013907 A1 | 1/2017 | Salmini | |
| 2017/0112220 A1 * | 4/2017 | Suddaby | A42B 3/064 |

OTHER PUBLICATIONS

International Search Report and Written Opinion, PCT IB2017/054850, dated Nov. 6, 2017, 12 pages.

Office action for U.S. Appl. No. 15/669,272, dated Feb. 4, 2020, 6 pages.

* cited by examiner

200

250

500

520

540

560

600

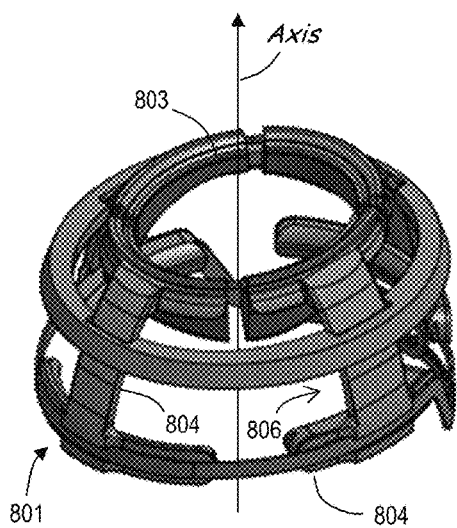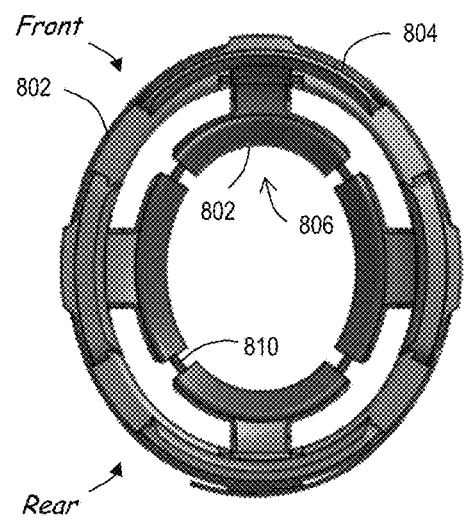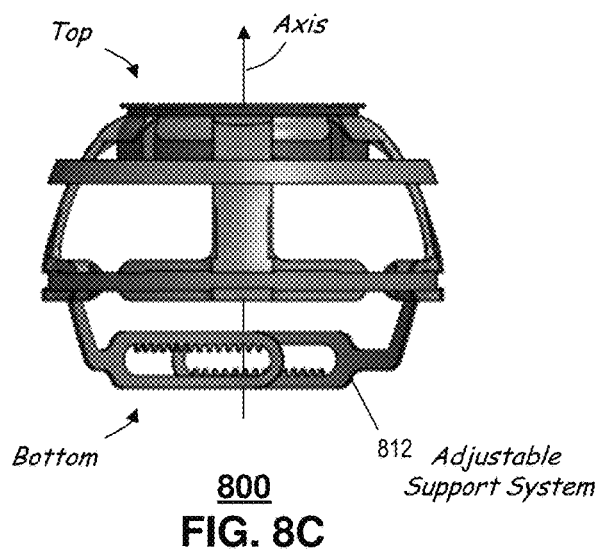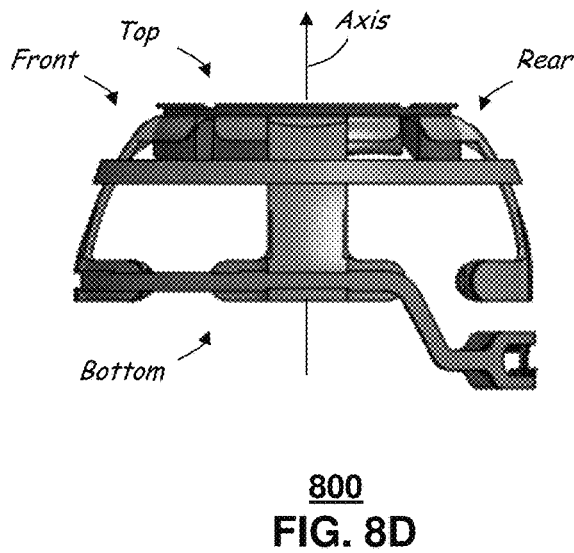
800
FIG. 8A
800
FIG. 8B
800
FIG. 8C
800
FIG. 8D

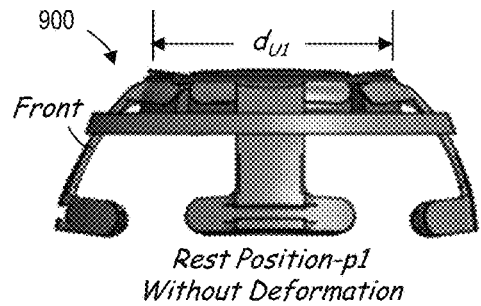
Rest Position-p1
Without Deformation
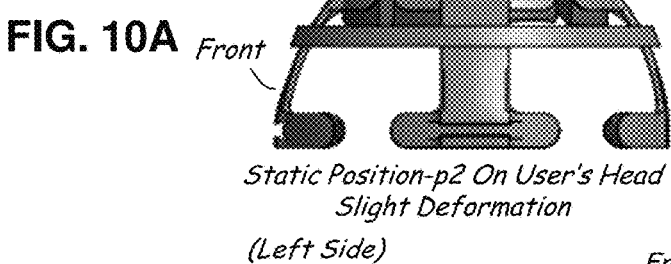
FIG. 10A
Static Position-p2 On User's Head
Slight Deformation
(Left Side)
FIG. 10B
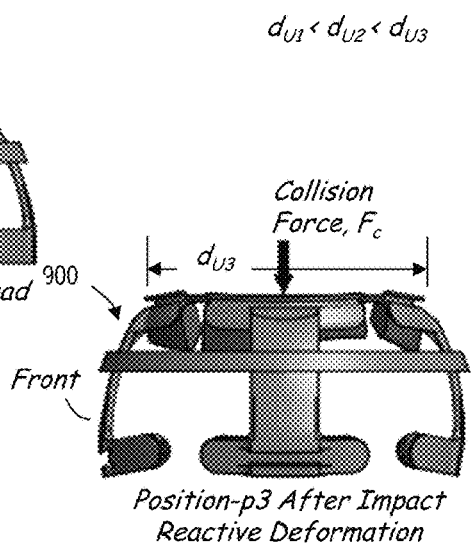
$d_{U1} < d_{U2} < d_{U3}$
Position-p3 After Impact
Reactive Deformation
FIG. 10C
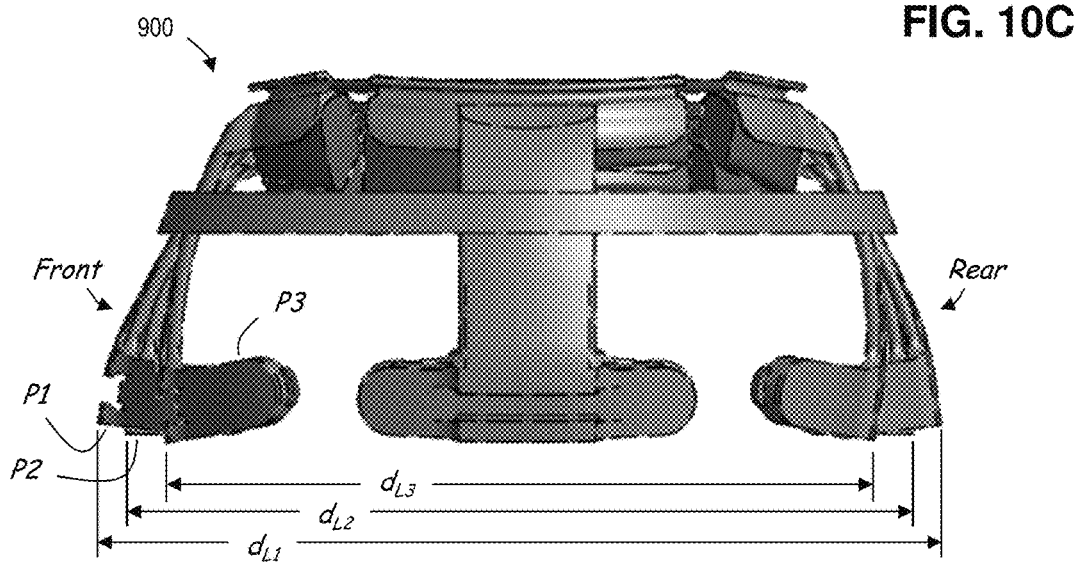
(Left Side)
$d_{L1} > d_{L2} > d_{L3}$
FIG. 10D

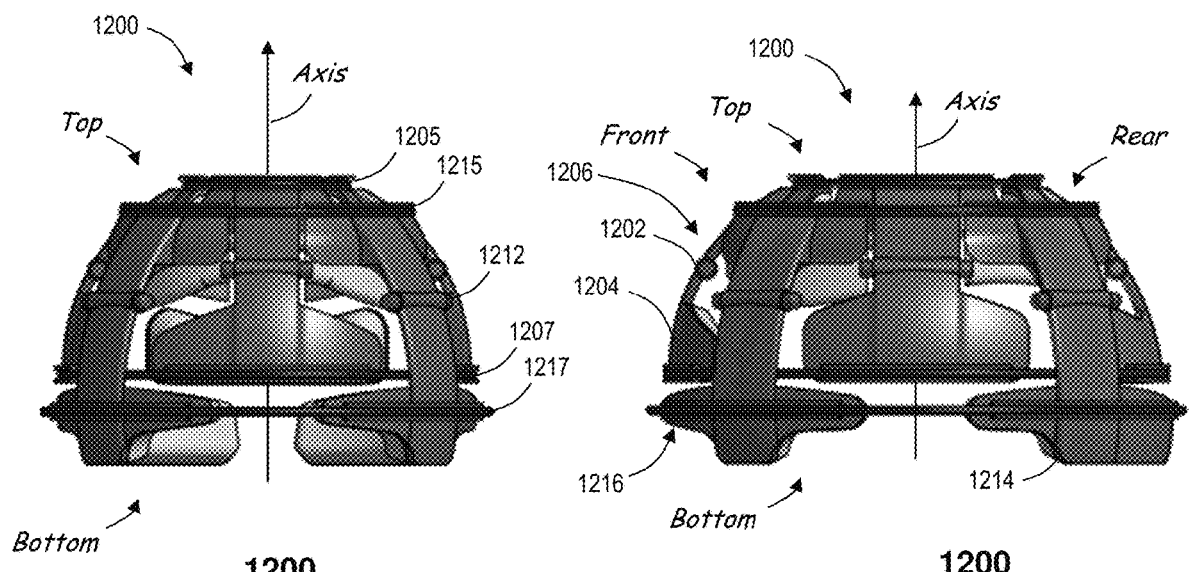
FIG. 12A
FIG. 12B
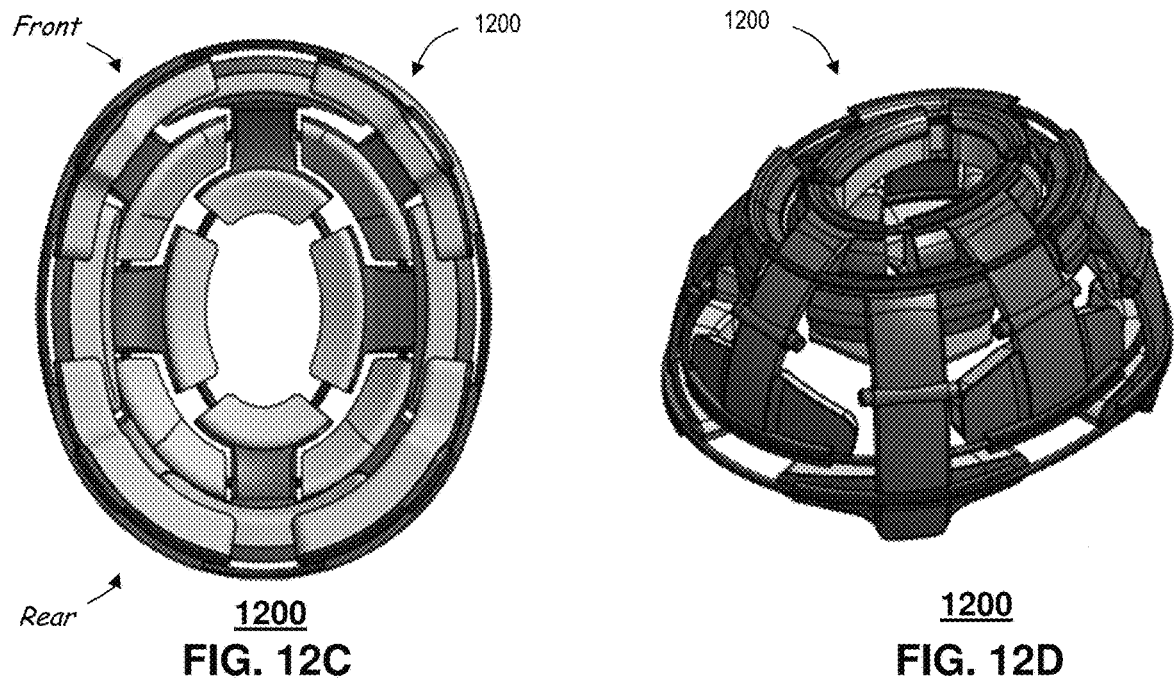
FIG. 12C
FIG. 12D

MECHANICAL SYSTEM

1300

- $k_1, k_2, k_3, k_4$ UPPER SPRINGS.
- $k_5, k_6, k_7, k_8$ LOWER SPRINGS.

ELECTRICAL SYSTEM

1400

MECHANICAL SYSTEM
1340
FIG. 13B
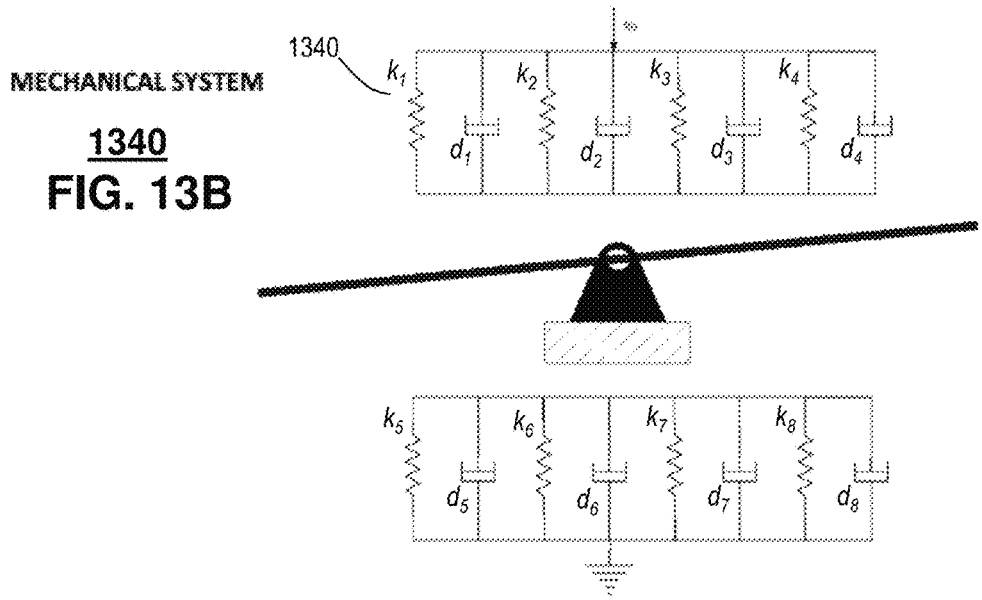
- $k_1, k_2, k_3, k_4$ UPPER SPRINGS.
- $k_5, k_6, k_7, k_8$ LOWER SPRINGS.
- Springs and dashpots (dampers) in series.
ELECTRICAL SYSTEM
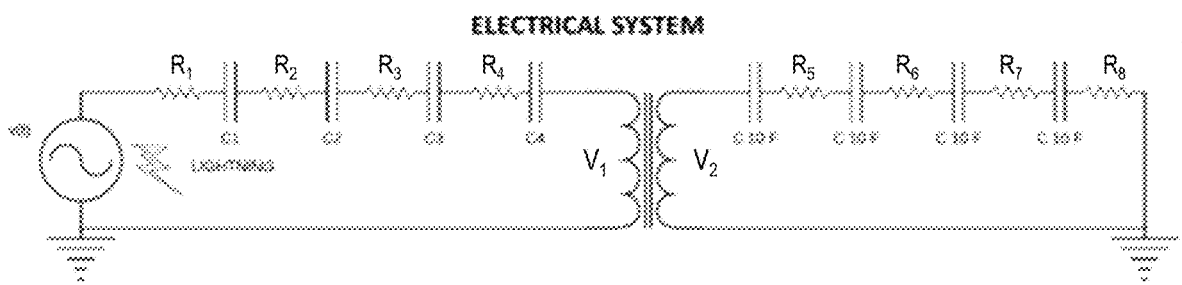
1440
FIG. 14B

1360

1900

1900

MECHANICALLY-ACTIVATED SHOCK ABATEMENT SYSTEM AND METHOD

CROSS-REFERENCE TO RELATED APPLICATIONS

This application claims priority to U.S. Provisional Patent Application No. 62/375,240, filed Aug. 15, 2016, which is incorporated herein by reference in its entirety.

FIELD OF THE DISCLOSURE

The subject disclosure relates to a mechanically-activated shock abatement system and method.

BACKGROUND

Safety helmets generally reduce effects of impacts to top and/or side of a user's head. Protective headgear often relies upon a hard outer casing with an impact-energy absorbing padding or a strap based suspension placed between the outer casing and the user's head. If a user wearing such hard shell helmet suffers a hard blow to the helmet, the impact of the hard shell meeting a hard surface generates a shockwave and a high impact force, that can be absorbed (to a limited extent) by the inner shock-absorbing material, or the straps in a typical suspension inside the hard casing and in contact with the user's head.

Various mechanisms responsible for brain injuries are understood to include focal type injuries that generally result from a direct impact to the head, sometimes resulting in cranial fracture. Other mechanisms include coup injuries that are brain contusions occurring at the point of impact, whereas, contrecoup injuries that result from the brain impacting a side of the skull opposite the point of impact. At least some injuries result from a displacement, e.g., a linear translation, of the brain within the skull. Still other injuries, including Diffuse Axonal Injuries (DAI), result from a rotational acceleration of the head and/or severe acceleration and/or deceleration that causes traumatic shearing forces, e.g., tissue sliding over tissue. DAI is believed to be one of the most common and devastating types of traumatic brain injury.

Some have disclosed protective helmets including a hard shell and an internal suspensions that include flexible cradle systems. For example, U.S. Pat. No. 2,870,445, to Fisher, discloses protective headgear and lining suspensions that include cradle straps joined together along an upper portion by an adjustment strap offering a flexible internal surface free of rigid projecting blow transmitting elements to cushion a head of a wearer. U.S. Pat. No. 3,054,111, to Hornickel et al., discloses a shock absorbing helmet that includes a head-receiving cradle formed from straps that may cross each other or be joined at their upper ends by a lace that makes the cradle adjustable. U.S. Pat. No. 2,921,318, to Voss et al. discloses a helmet lining that includes several flexible cradle straps extending up into a crown of a protective helmet from circumferentially spaced points around a lower portion. Each strap includes a strip of woven material that necks down as it stretches in reaction to a blow against the helmet. Other web-like support systems that include strips of flexible material that cross each other are disclosed in U.S. Pat. App. Pub. No. 2002/0000004 to Wise et al.

Others have disclosed protective helmets including a hard shell and external features to reduce head injury risk. For example, U.S. Pub. Pat. App. No. 2015/0157080, to Camarillo et al., U.S. Pub. Pat. App. No. 2011/0185481, to Nagely et al., and U.S. Pat. No. 5,581,816, to Davis, disclose wearable devices having force redirecting units connected between an outer surface of a helmet and a shoulder brace for redirecting head impact forces from a wearer's head to another body part. U.S. Pub. Pat. App. No. 2010/0229287, to Mothaffar, discloses an arrangement of straps extending from a helmet to other parts of a body to limit a range of motion of a wearer's head and flexure of their neck.

Still others have disclosed energy absorbing structures for placement along an interior surface of a helmet. For example, U.S. Pat. No. 9,316,282, to Harris, discloses energy absorbing, collapsible disk structures that have collapsible arms around a perimeter of two disks sandwiching that cause an elastic material to stretch, storing kinetic energy from a vertical direction as potential energy in a horizontal direction. U.S. Pat. No. 2,879,513, to Hornickel et al., discloses a crushable block of energy absorbing material disposed in each loop between a lace and an inner end of suspension cradle straps. Energy absorbed in crushing the blocks reduces the shock of an impact against a wearer's head. U.S. Pat. App. Pub. No. 2009/0260133, to Del Rosario, discloses an impact absorbing frame and multi-layered structure that includes inner opposite-facing inner panels that undergo elastic deformation and compress and expand to dissipate impact energy. U.S. Pat. No. 9,314,063, to Bologna et al., discloses a protective football helmet having a one-piece molded shell with an impact attenuation member formed by removing material from a front portion of the shell to form a cantilevered segment.

Although these and other conventional helmet liners have worked well, they have failed to provide protection against both high and low degrees of impact imparted on a helmet over the extended life of the helmet. The impact force is often so great that the user's helmet may even initially bounce back upon impact, thrusting the user's head away from the blow, subjecting the head and neck regions to additional injury causing forces. If the impact is severe enough, it may lead to a concussion (striking of the brain matter to the skull with moderate force) or worse.

BRIEF DESCRIPTION OF THE DRAWINGS

FIGS. 8A-8D depict top perspective, bottom, front and side views, respectively, of an illustrative embodiment of a helmet impact shock abatement system;

FIGS. 10A-10D depict a front view of the helmet system depicted in FIGS. 8A-8D in various stages of deformation when exposed to a vertical impact force;

FIGS. 12A-12D depict front and side, bottom and top perspective views, respectively, of an alternative helmet impact shock abatement system;

FIGS. 13A-14A depict schematic diagrams of a mechanical and electrical analog of the helmet system depicted in FIGS. 8A-8D;

FIGS. 13B-13C and 14B depict schematic diagrams of mechanical and electrical analogs of example helmet system;

DETAILED DESCRIPTION

Figure 1:
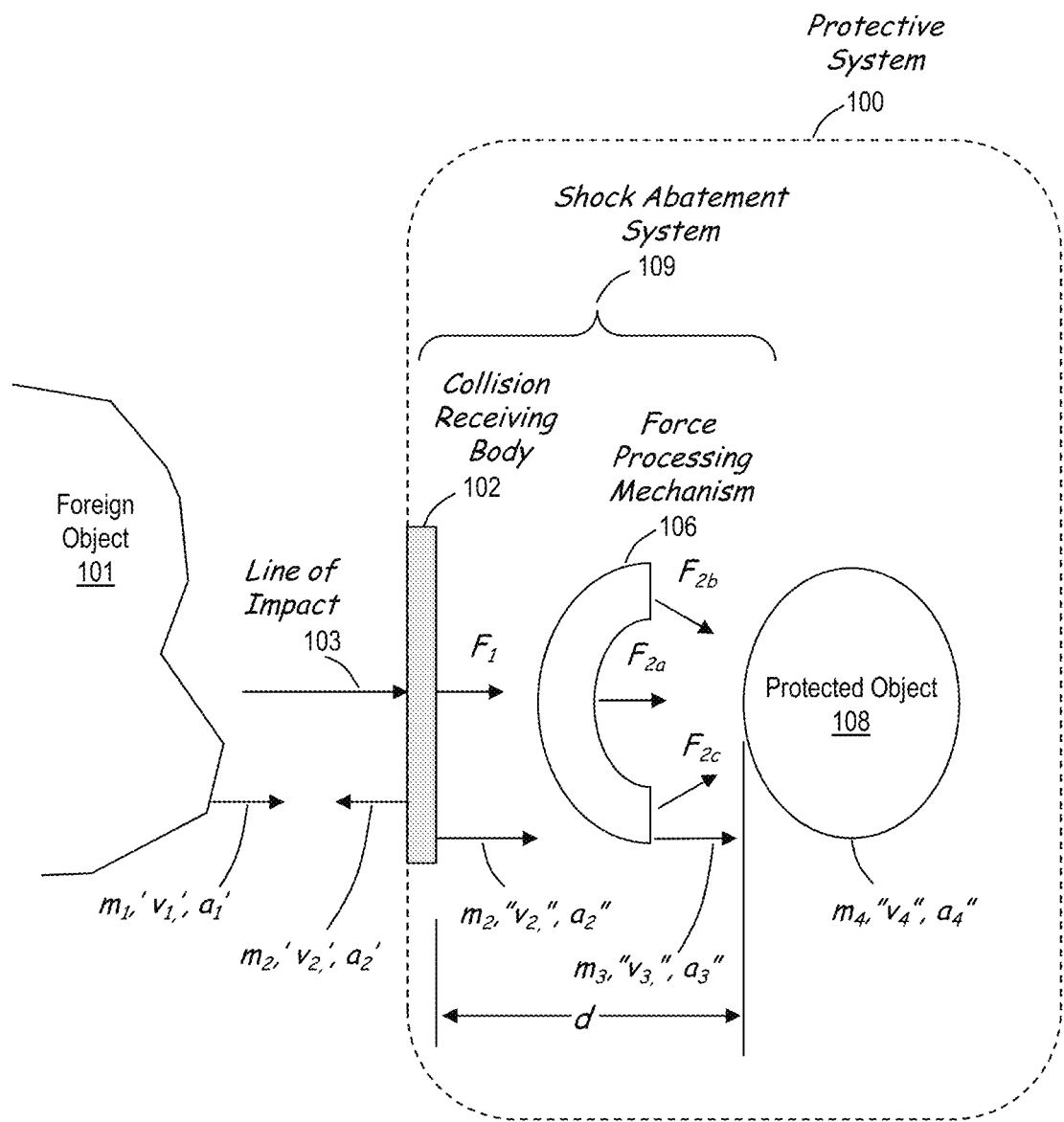
FIG. 1 depicts a schematic representation of an example of a collision protective system.

The subject disclosure describes, among other things, illustrative embodiments of devices and processes that abate impact shocks by enacting a machine that redirects at least a portion of an impact force imposed along one trajectory to a reaction force distributed along another trajectory. Other embodiments are described in the subject disclosure.

One or more aspects of the subject disclosure include a process in which a helmet system including a machine receives a collision force along a first direction resulting from kinetic energy of an impact encountered at an external surface of the helmet system to obtain a received collision force. The helmet system, when worn on a head portion, a neck portion, or both of a body, positions the machine in a proximate relationship to the head portion, the neck portion, or both. The received collision force transferred is redistributed by the helmet system. The actuation of the machine occurs responsive to the received collision force, wherein the redistributing of the received collision force is based on the actuation of the machine. A collision energy transferred to the head portion, the neck portion, or both, resulting from the kinetic energy of the impact, is reduced based on the actuation of the machine. An impact response of the head portion, the neck portion, or both, is also reduced base on the actuation of the machine.

One or more aspects of the subject disclosure include a process in which a helmet system including a machine receives an impact force resulting from a collision between an external surface of a helmet system and a foreign object to obtain a received collision force. The helmet system, when worn on a head portion, a neck portion or both of a body, positions the machine in a proximate relationship with the head portion, the neck portion, or both. A collision parameter is based on the received collision force. A machine of the helmet system is selectively actuated based on the collision parameter exceeding at least one threshold, wherein a first portion of the kinetic energy is expended by the actuating of the machine, and wherein the received collision force is redistributed based on the actuation of the machine.

One or more aspects of the subject disclosure include a process in which a helmet system including a machine is provided. The helmet system is wearable upon a head portion, a neck portion, or both of a body to place the machine in a proximate relationship to the head portion, the neck portion or both. The helmet system is configured to receive a collision force along a first direction resulting from kinetic energy of an impact encountered between an external surface of the helmet system and a foreign object, to obtain a received collision force. The machine is selectively actuated based on a collision parameter exceeding a threshold, wherein a first portion of the kinetic energy is expended by the actuating of the machine and wherein the received collision force is redistributed based on the actuation of the machine.

One or more aspects of the subject disclosure include a process that provides a helmet system, that when placed on a head portion, a neck portion, or both, of a user, positions the machine in a proximate relationship to the head portion, the neck portion, or both. The helmet system receives a collision force along a first direction resulting from kinetic energy of an impact encountered at an external surface of the helmet system to obtain a received collision force. The helmet system provides a redistributing of the received collision force. The redistributing of the received collision force is based on the actuation of the machine. A collision energy transferred to the head portion, the neck portion, or both, resulting from the kinetic energy of the impact is reduced based on the actuation of the machine, and an impact response of the head portion, the neck portion, or both, is reduced base on the actuation of the machine.

As used herein the term machine generally refers to one or more devices that use and/or apply mechanical energy and/or power to perform a particular task. A machine can include one or more parts, each with a definite function, that cooperate together and/or with other structures to perform the particular task. In general, machines can transmit and/or modify force and/or motion. The particular tasks can include, without limitation, a redistribution of a collision force, a redistribution of energy or both. The term machine includes one or more elementary machines, such as a lever, a wheel and axle, a pulley, a screw, a wedge, and an inclined plane, generally referred to as simple machines. In at least some applications, the term machine can include complex machines, e.g., including a combination of one or more simple machines.

Machines can include, without limitation, devices that can be actuated, e.g., by applied energy and/or power. Actuation of the machine can set one or more parts or components of the machine into motion. The motion can include a controlled movement that can be controlled at least in party in a predetermined manner according to a structure of the machine. For example, controlled movement can allow parts to move in one direction while preventing the parts to move in another direction. Motion can include linear motion, rotational motion, and any combination thereof. In at least some embodiments, machines can include one or more elements that result in an irreversible transformation of at least a portion of energy applied to the machine.

This application is related to U.S. Patent Application No. 15/380,967, entitled "Lever-Activated Shock Abatement System and Method," and filed on Dec. 15, 2016, since issued on Sep. 5, 2017, as U.S. Pat. No. 9,750,297, which is incorporated herein by reference in its entirety.

A collision generally refers to a short-duration interaction between two or more bodies, resulting in a change in motion of the bodies involved due to internal forces acting between them. Collisions can be elastic, inelastic or some combination of both. All collisions conserve momentum. Elastic collisions conserve both momentum and kinetic energy; whereas, inelastic collisions conserve momentum, but not kinetic energy. A coefficient of restitution, e.g., ranging between 0 and 1, provides a measure of a degree to which a collision is elastic, "1", or inelastic "0".

A line of impact can be defined as a line drawn between centers of mass of two colliding bodies that passes through a contact point between the bodies. Collisions can be "head on" in which a velocity of each body just before impact is along the line of impact. Alternatively, collisions can be non-head on, also referred to as oblique collisions, e.g., glancing blows, in which the velocity of each body before the impact is not along the line of impact.

A magnitude of a relative velocity between two colliding bodies at a time of impact can be referred to as a closing speed. In a collision between two bodies, a change in motion of one of the bodies resulting from a collision with another one of the bodies depends on how the bodies collided, how long it took the bodies to stop or slow, across what distance the collision occurred, and a degree of deformity of one or both of the bodies.

Collisions also involve forces related to changes in velocities of the different colliding bodies. Namely, each body involved in a collision experiences a respective impact force. The collision causes a change in acceleration of each body resulting from the collision that occurs over a time interval of the collision. The impact force can be estimated or otherwise approximated as a product of the body's mass and the acceleration, e.g., a change in velocity with respect to time, resulting from the collision. In some instances the impact force can be represented as an average value, e.g., F=ma, in which the acceleration, a, is an average acceleration based on the collision. In general, it is understood that the acceleration can include one of a linear acceleration, a rotational acceleration, or both. Accelerations can be positive or negative. For example, a body at rest hit by another body will experience an acceleration, whereas, a body moving that hits another body at rest will experience a deceleration.

FIG. 1 depicts a schematic representation of an example of a collision protective system. FIG. 1 provides a schematic representation of two objects, a protective system 100 and a foreign object 101, just prior to a collision between them. The protective system 100 includes a shock abatement system 109 that offers a protected object 108 some measure of protection against impact forces of the collision. Without limitation, the protected object 108 can include a portion of a body, such as a head, a neck, and/or any portion thereof.

Generally speaking, the foreign object 101 includes any object capable of colliding with the protective system 100. Examples of foreign objects 101 include, without limitation, any movable object, such as a vehicle, a body, a portion of a body, an article, goods, materials, merchandise, and the like, including other protective systems 100. Alternatively or in addition, the foreign object 101 can include immovable or substantially immovable objects, such as a building, a portion of a building, a wall, a floor, the ground, a tree, a guardrail, and the like. In some scenarios, one of the objects 100, 101 is stationary just prior to a collision, whereas, the other object is moving. In other scenarios both objects 100, 101 are moving, e.g., towards each other, away from each other, according to virtually any relative position, direction, speed, and/or acceleration that results in a collision between the two objects 100, 101.

In general, the colliding object has a respective mass, $m_1$, a respective velocity, $v_1$, and a respective acceleration, $a_1$. Likewise, the protect system 100 has a respective mass, $m_2$, a respective velocity, $v_2$, and a respective acceleration, $a_2$. It is understood that the velocity and acceleration values include vector quantities. The protective system 100 provides a measure of protection to the protected object 108 under various circumstances. For example, the foreign object 101 can be moving in a direction that will lead to a collision between the foreign object 101 and the protective system 100, while the protective system 100 is stationary. Alternatively, the foreign object 101 can be stationary, while the protective system 100 is moving in a direction that will lead to a collision between the foreign object 101 and the protective system. More generally, the foreign object 101 and the protective system 100 can be moving in respective directions that will lead to a collision between the foreign object 101 and the protective system 100.

The example protective system 100 includes the shock abatement system 109, including a collision receiving body 102, an impact force processing mechanism 106, and the protected object 108. It is understood that in some embodiments, a relative motion can exist between one or more components of the protective system. The protective system 100 can be examined according to one or more states, e.g., a pre-collision state, a colliding state, and a post-collision state. It is understood that in a pre-collision state, there is little or no relative motion between one or more of the collision receiving body 102 and the protected object 108. That said, in some embodiments, a limited degree of motion can be allowed in the pre-collision state, e.g., to provide for comfort to the protected object during normal usage and/or motion apart from any collision. Likewise, little or no relative motion between one or more of the collision receiving body 102 and the protected object 108, or a limited degree of motion can be allowed, e.g., to provide for comfort to the protected object after experiencing a collision.

During a collision, one or more of the collision receiving body 102 and the protected object 108 can experience a relative motion with respect to each other. Consider, by way of example, a head on collision between a moving foreign object 101 and a stationary protective system 100. The foreign object 101, moving to the right at a constant velocity $v_1$, has a pre-collision momentum of $m_1 v_1$, whereas, the protective system 100, being stationary, has a pre-collision momentum of 0. At a beginning instant of the collision, e.g., at t=0+, the collision receiving 102 body is moved to the right, towards the stationary protected object 108. To the extent that the collision receiving body 102 and the protected object 108 are not joined by a rigid, incompressible linkage, there will likely be at least some relative motion between the collision receiving body 102 and the protected object 108.

Continuing with the example, the bodies 102, 108 would begin to approach each other at the beginning of the collision, they may continue to approach each other as the collision progresses until at some point the force processing mechanism 106 and/or the protected object 108 will also begin to move. Relative motion between two or more of the objects 102, 106, 108 will depend to at least some degree on deformability of the collision receiving body 102, initial separation distance between the collision receiving body 102, the force processing mechanism 106, and the protected object 108. According to the illustrative example, a substantial separation is shown between each of the three items 102, 106, 108, with a separation distance, d, between an interior surface of the collision receiving body 102 and a facing surface of the protected object 108. It is understood that in at least some applications little or no space may be provided between the collision receiving body 102, the force processing mechanism 106 and/or between the force processing mechanism 106 and the protected object 108.

Relative motions between the collision receiving body 102 and the protected object 108 that reduce their separation can impart a compressive force upon the impact force processing mechanism 106. In at least some embodiments, a compression of the impact force processing mechanism 106 activates the impact force processing mechanism 106. Such activation can include activation(s) of one or more shock abatement mechanisms of the impact force processing mechanism 106. For example, at least a portion of an impact force directed along the line of impact, can be diverted or otherwise redirected to another direction. As disclosed further hereinbelow, such redirections can vary between 0°-180°. In at least some embodiments, the force processing mechanism 106 diverts a portion of the impact force received along a line of impact to opposing redirected impact force components at +/−90°. Proper alignment of the opposing redirected impact force components act upon the protected object 108 in opposition to reduce or elimination displacement of the protected object. Consequently, a portion of the impact force that would otherwise lead to a displacement of the protected object 108 is diverted to a compressive force acting upon the protected object 108.

It is understood that in at least some applications, the force processing mechanism 106 reacts in one manner in response to minor impact forces, e.g., due to normal use, and in another manner in response to major impact forces that could otherwise result in injurious collisions. In at least some embodiments, the force processing mechanism 106 can be configured to selectively react to major impact forces, without providing any substantial response to relatively minor impact forces. Alternatively or in addition, the force processing mechanism 106 can be configured to react to any impact force, e.g., providing a scalable response based on the impact force.

In at least some embodiments, the force processing mechanism 106 can be adapted to provide a selective response based upon a control. For example, the control can include a degree of compressive force applied to the force processing mechanism 106, e.g., between the collision receiving body 102 and the protected object 108. Namely, the force processing mechanism 106 reacts in one manner to a minor compressive force, e.g., below some predetermined threshold value, and in another manner to a major compressive force, e.g., above the predetermined threshold. Alternatively or in addition, the control can be based on a distance and/or volume. For example the force processing mechanism 106, can be configured to provide a first response based on a separation distance, d, between an interior surface of the collision receiving body 102 and an opposing surface of the protected object being greater than a separation distance threshold, and a second response based on the separation distance falling below the threshold. For example, a minor impact force may result in a minor relative displacement of the bodies 102, 108, allowing the force processing mechanism 106 to provide little or no response, as none may be necessary for protection of the protected object 108. Conversely, a major impact force may result in a substantial relative displacement of the bodies 102, 108, causing the separation distance to fall below a threshold and allowing the force processing mechanism 106 to provide a major response to protect the protected object 108.

Other control variables can include, without limitation, absolute velocities of one or more of the bodies 102, 106, 108, relative velocities of one or more of the bodies 102, 106, 108, e.g., respect to each other and/or to some other reference. Likewise, other control variables can include absolute accelerations of one or more of the bodies 102, 106, 108, relative accelerations of one or more of the bodies 102, 106, 108, e.g., respect to each other and/or to some other reference.

Figure 2A:
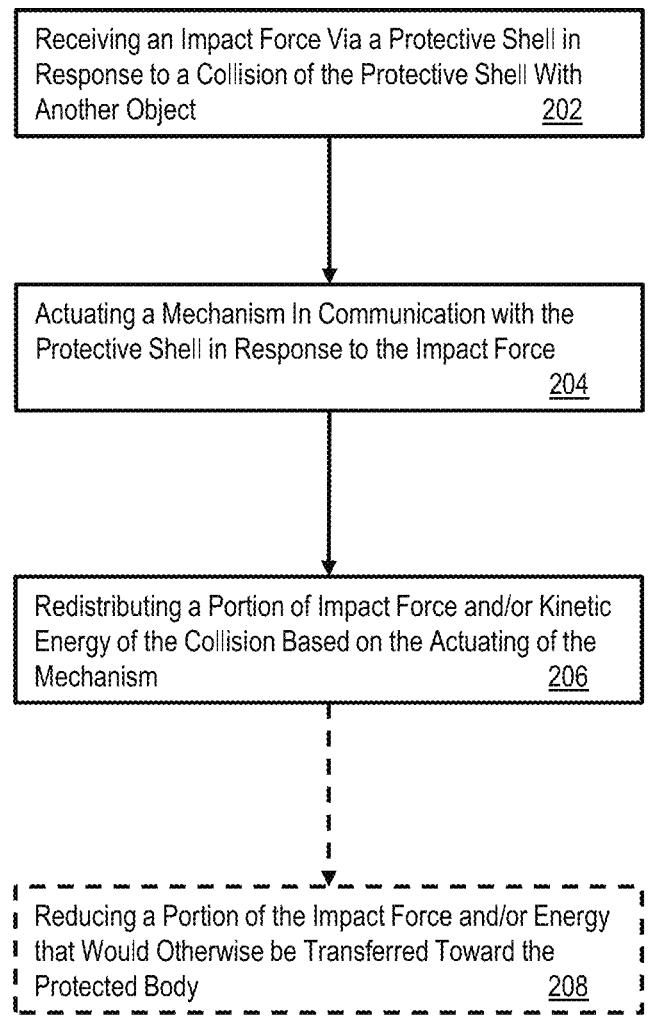
FIG. 2A depicts a process for abating shock resulting from a collision.

FIG. 2A depicts a process 200 for abating collision-induced shock. A protective shell of a protective system receives or otherwise experiences an impact force in response to a collision between the protective shell and another external object at 202. The shell can include any of the various protective shells disclosed herein, such as unitary shells, sections and/or segmented shells. The providing of the helmet system, including any of the example helmet systems disclosed herein, can include providing only an operative portion of the helmet system, such as a machine that when combined with a protective shell, operates as described herein.

Any of the collisions disclosed herein generally result in a transfer of energy between the colliding objects. It is understood that any of the collisions disclosed herein can include elastic collisions, inelastic collisions, and/or partially inelastic collisions. The example collision can result from a relative movement of the external object with respect to the protective shell. It is understood that in some instances the protective shell can be stationary at the moment of collision. Alternatively, the protective shell can be in motion at the moment of collision.

A force processing mechanism or machine in communication with the protective shell is actuated at 204 in response to the impact force. For example, the force processing mechanism, or machine, can be disposed between the protective shell and a protected body. Alternatively or in addition, the processing mechanism or machine can be attached to, integrally formed with, and/or provide the function of the protective shell. For example, one or more cantilevered segments can be formed by removing material from a portion of a shell. At least one of the one or more cantilevered segments can be operatively coupled to one or more of the example mechanisms and/or machines disclosed herein to redistribute a non-trivial portion of a collision energy that absorbs and/or dissipates energy in directions other than a line of impact of the collision. Actuation can be based on one or more of a change in momentum, velocity, acceleration and/or position between one or more of the collision receiving body and the protected object. For example, a collision can result in a relative closure between the collision receiving body 102 (FIG. 1) and the protected object 108 (FIG. 1). The closure can be measured, e.g., according to a separation distance, d, between the bodies. In at least some applications, the closure imparts a force, e.g., a compressive force, upon a force processing mechanism 106 (FIG. 1) of a shock abatement system 109 (FIG. 1) of the protective system 100 (FIG. 1).

A first portion of the impact force and/or kinetic energy of the collision is redistributed based on the actuating of the mechanism at 206. Redistribution can include a change in direction. For example, a collision force received along a line of action can produce a change in motion of the collision receiving body, such as a movement of at least the outer portion of the helmet system. A resulting impact force, and/or a relative motion between the outer portion of the helmet system, e.g., resulting from a transfer of energy, can squeeze the force processing mechanism 106 along a first direction, e.g., generally towards the protected object along the line of action. Actuation of the force processing mechanism 106, however, causes movement of one or more portions of the force processing mechanism 106 that introduces forces upon one or more of the collision receiving body and the protected object.

In at least some embodiments, resulting forces act on the protected object in directions that are orthogonal to the line of action and/or the impact force acting upon the force processing mechanism. Such redirection can introduce opposing forces upon the protected object that can prevent motion of the object according to a balancing effect of the forces. It is understood that the object can experience a resulting compression, e.g., without a corresponding translation and/or rotation. In at least some embodiments, the resulting forces act on the protected object in directions that are substantially opposite to the line of action and/or the impact force acting upon the force processing mechanism. Once again, such opposing forces can reduce and/or prevent motion of the protected body.

In at least some embodiments, the process 200, includes reducing a second portion of the impact force and/or energy that would otherwise be transferred toward the protected body at 208 (shown in phantom). This reduction can include one or more of absorbing and/or dissipating energy associated with the collision. The absorbing and/or dissipating energy can occur, at least in part, along a direction other than the line of action. Alternatively or in addition, a reduction of at least a portion of the impact force can include an elastic and/or plastic behavior of materials to transform at least a portion of impact kinetic energy. Namely, impact energy can be absorbed by a break or fracture, a dent, a deformation or other temporary and/or permanent alteration of a protective system component. For example, some protection systems, such as motorcycle and/or bicycle helmets that are designed to break, fracture and/or otherwise deform in response to a collision. In at least some embodiments, energy absorption can be accomplished by distortion of a resilient and/or compliant member. Examples include, without limitation, storing kinetic energy of the collision in mechanical energy, e.g., potential energy of a distorted spring, a compressed resilient pad, and the like.

Alternatively, the collision can be complex. For example, the collision can include multiple forces applied along multiple directions. Consider an example of a helmet being driven into an interior 90 degree corner, such that both walls exert respective forces upon the helmet. Complexity can include a sequence of collisions that can be applied in a rapid and possibly overlapping manner According, an initial state of any single collision can be a resting state, e.g., static worn state, or a distorted state as may have resulted from an immediately preceding collision.

Figure 2B:
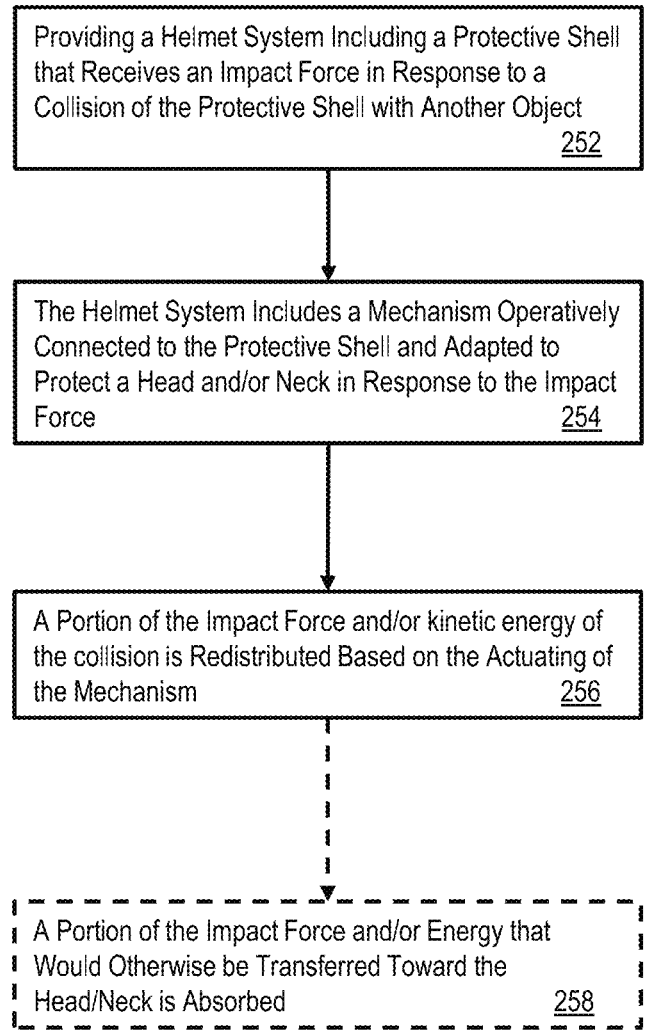
FIG. 2B depicts another process for abating shock resulting from a collision.

FIG. 2B depicts another process 250 for abating collision-induced shock. The process includes providing and/or assembling a helmet system that includes a protective shell that receives or otherwise experiences an impact force in response to a collision between the protective shell and another external object at 252. The shell can include any of the various protective shells disclosed herein, such as unitary shells, sections and/or segmented shells. The providing of the helmet system, including any of the example helmet systems disclosed herein, can include providing only an operative portion of the helmet system, such as a machine that when combined with a protective shell, operates as described herein. Alternatively or in addition, the providing of the helmet system can include providing an assembled helmet system and/or assembling the entire system and/or at least an operative part of the helmet system, such as the machine and/or mechanisms that are actuated responsive to a collision to redirect the received collision force, and/or to absorb at least a portion of the kinetic energy of the collision.

The helmet system includes a force processing mechanism, such as a machine, that is actuated at 254 in response to the impact force. Actuation can be based on one or more of a change in momentum, velocity, acceleration and/or position between one or more of the collision receiving body, e.g., an outer portion of the helmet system, the machine, and/or the protected object, e.g., a user's head and/or neck. The outer portion of the helmet system can include an exterior-facing portion of the machine, a protective shell, and/or a combination thereof.

A first portion of the impact force and/or kinetic energy of the collision is redistributed based on the actuating of the mechanism at 256. Redistribution can include a change in direction. For example, a collision force received along a line of action can produce a change in motion of the collision receiving body, such as a movement of at least the outer portion of the helmet system. A resulting impact force, and/or a relative motion between the outer portion of the helmet system, can squeeze the force processing mechanism 106 along a first direction, e.g., generally towards the protected object along the line of action. Actuation of the force processing mechanism 106, however, causes movement of one or more portions of the force processing mechanism 106 that introduces one or more forces acting upon one or more of the collision receiving body and the protected object.

In at least some embodiments, the process 250, includes reducing a second portion of the impact force and/or energy that would otherwise be transferred toward the protected body at 258 (shown in phantom). This reduction can include one or more of absorbing and/or dissipating energy associated with the collision. The absorbing and/or dissipating energy can occur, at least in part, along a direction other than the line of action. Alternatively or in addition, a reduction of at least a portion of the impact force can include an elastic and/or plastic behavior of materials to transform at least a portion of impact kinetic energy. Namely, impact energy can be absorbed by a break or fracture, a dent, a deformation or other temporary and/or permanent alteration of a protective system component.

Figure 3:
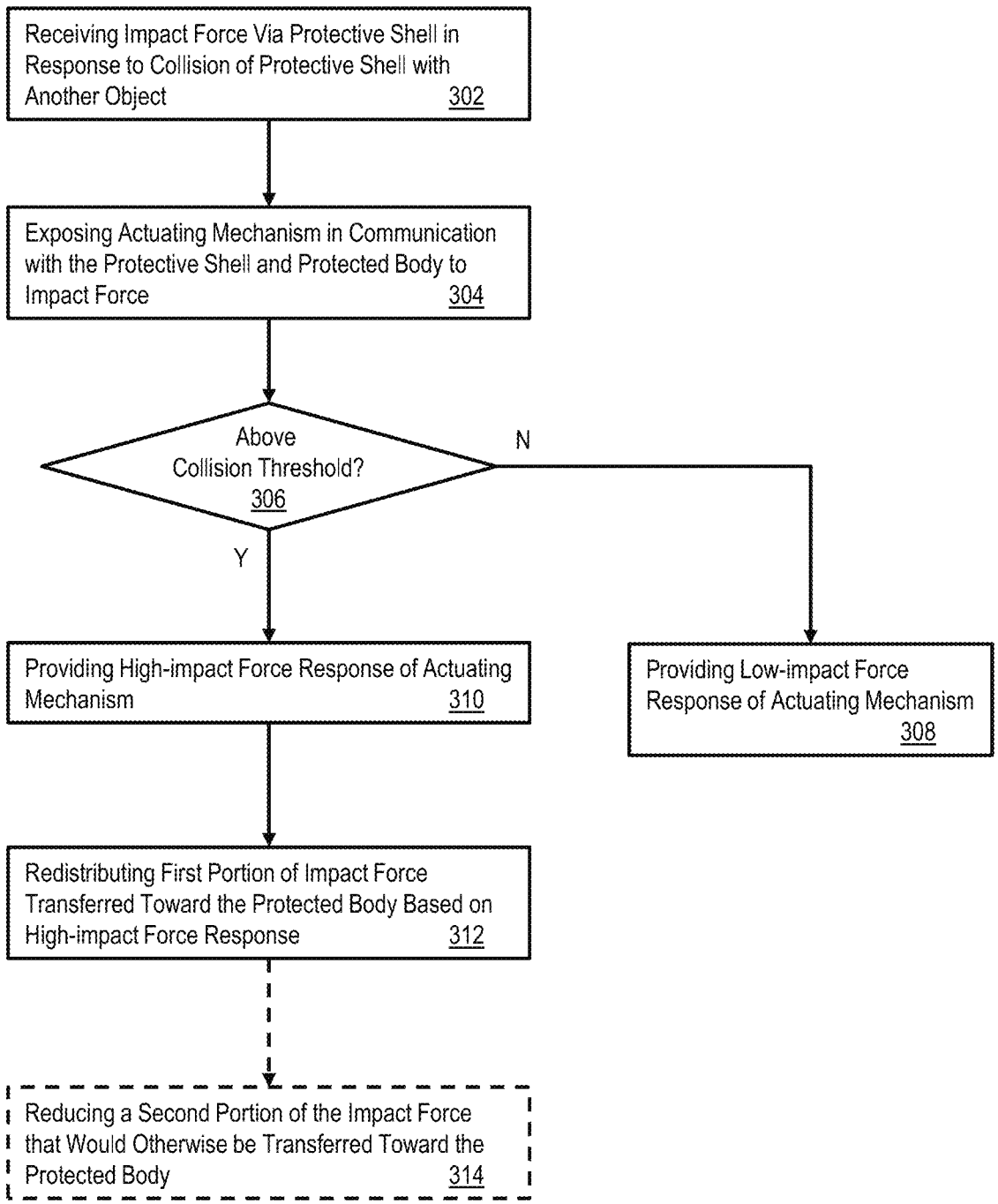
FIG. 3 depicts another process for abating shock resulting from a collision.

FIG. 3 depicts another process 300 for abating shock resulting from a collision. An impact force is received at 302 via a protective shell in response to a collision between the protective shell and another object. An actuating mechanism disposed between protective shell and protected body is exposed to an impact force 304. The impact force is based on the collision and can be determined according to an average acceleration of the body over a duration of the collision.

A determination is made at 306, as to whether the impact force is above a collision threshold. To the extent that the collision force is not above the collision threshold, a low-impact force response of actuating mechanism is provided or otherwise applied at 308. Such low impact force responses include normal ranges of motion, jostling, etc., that might be experienced during normal uses. For periods of normal use, any impact forces would not be expected to result in harm and/or injury to any protected object. Accordingly, a determination can be made beforehand as to the types, magnitudes and/or directions of impact forces that are likely to cause severe discomfort, harm and/or injury. This determination can be used in design of any particular system, e.g., in choice of types of machines, numbers of machines, placement of machines, actuation thresholds, and the like.

To the extent that the collision force is above the collision threshold, a high-impact force response of actuating mechanism is provided or otherwise applied at 310. Redistributing first portion of impact force transferred toward the protected body based on high-impact force response at 312.

In at least some embodiments, the process 300, includes reducing a second portion of the impact force that would otherwise be transferred toward the protected body at 314 (shown in phantom).

Figure 4:
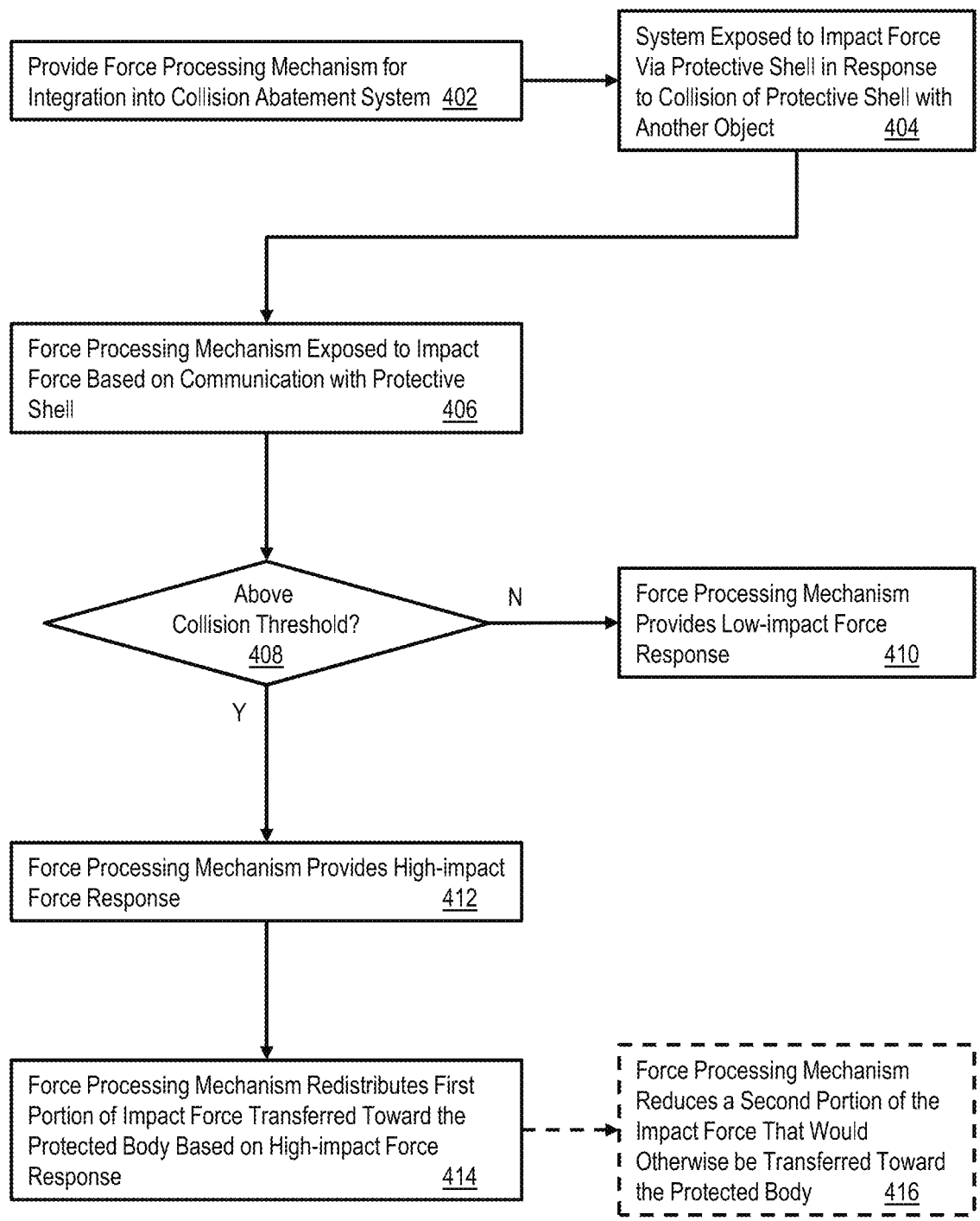
FIG. 4 depicts yet another process for abating shock resulting from a collision.

FIG. 4 depicts yet another process 400 for abating shock resulting from a collision. The process includes providing a shock abatement system, e.g., including a force processing mechanism, for integration into a protection system at 402. Providing of the shock abatement system can include constructing and/or otherwise assembling at least a portion of the shock abatement system. Alternatively or in addition, providing of the shock abatement system can include joining, assembling and/or otherwise combining the shock abatement system with a collision receiving body, such as a protective shell.

An impact force is received at 404 via a protective shell in response to a collision between the protective shell and another object. A force processing mechanism, e.g., disposed between a protective shell and a protected body is exposed to impact force 406. A determination is made at 408, as to whether the impact force is above a collision threshold. To the extent that the collision force is not above the collision threshold, a low-impact force response of actuating mechanism is provided or otherwise applied at 410. Once again, such low impact force responses include normal ranges of motion, jostling, etc., that might be experienced during normal uses. For periods of normal use, any impact forces would not be expected to result in harm and/or injury to any protected object.

To the extent that the collision force is above the collision threshold, a high-impact force response of actuating mechanism is provided or otherwise applied at 412. Redistributing first portion of impact force transferred toward the protected body based on high-impact force response at 414.

In at least some embodiments, the process 400, includes reducing a second portion of the impact force that would otherwise be transferred toward the protected body at 416 (shown in phantom).

In some embodiments, a single threshold is provided, such that actuation of a machine portion of a helmet system occurs responsive to a collision parameter exceeding the single threshold. Alternatively or in addition, a helmet system can include multiple thresholds. For example, actuation of the machine can occur in stages, e.g., based on a collision parameter exceeding successive thresholds. In some embodiments, different machines and/or different portions of the same or similar machine can responds differently based on a collision parameter exceeding different thresholds. In at least some embodiments, the number of thresholds is relatively large, and the thresholds successive, such that a difference between successive thresholds is relatively small. It is understood that the number of and/or separation between thresholds can at least approximate an analog and/or continuous response, e.g., as in servo control applications.

FIGS. 5A-5D depict schematic representations of example of a collision protective systems. In a first embodiment shown in FIG. 5A, a protective system 500 includes a force processing mechanism 504 that includes a machine 506. The machine 506 of the illustrative example is positioned between a collision receiving body 502, e.g., a protective member or shell and a protected object 508. The machine 506 is actuated in response to a collision of an external surface of the collision receiving body 502 along a line of impact 503. The line of impact is drawn at an angle θ with respect to a surface normal of the collision receiving body 502. It is understood that the line of impact angle can take on any angle, from head on or normal angle of incidence to an oblique angle of incidence, including a glancing blow. It is further understood that although a single line of impact is shown, actual collisions may occur at multiple locations, simultaneously and/or a slightly delayed times. The techniques disclosed herein can be applied alone or in any combination to offer protection to the protected object 508 in view of such anticipated and/or unanticipated collisions.

The machine 506 can include, without limitation, any of a number of generally known simple machines, such as inclined planes, levers, pulleys, gears, screws and the like. The machine 506 can include one or more such simple machines acting alone or in combination with other simple or even more complex machines. The machine 506 can be actuated by one or more of the impact force itself, e.g., related to an inertia and/or a change in momentum. Alternatively or in addition, the machine 506 can be actuated by relative velocities, accelerations and/or positions of the collision receiving body 502 and/or the protected object 508.

For example, an impact causes the collision receiving body 502 to accelerate towards the protected object. Such relative motion generally closes any gap between the collision receiving body 502 and the protected object 508. The relative movement can be used to rotate a lever, to rotate a gear, to rotate a cable about a pulley, to turn a screw, and/or to deform a deformable member, such as a resilient pad and/or spring, and the like.

Figure 5A:
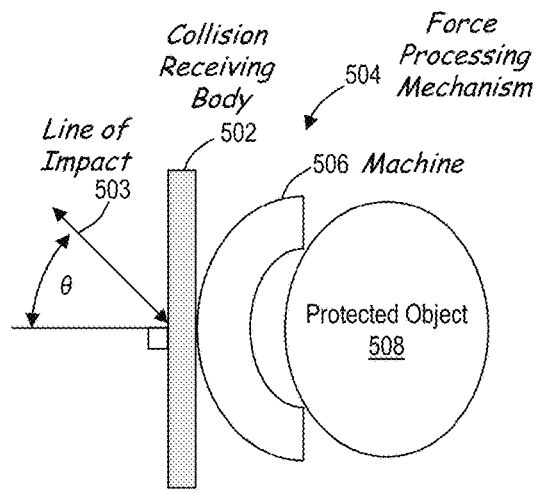
FIGS. 5A-5D depict schematic representations of example of a collision protective systems.
Figure 5B:
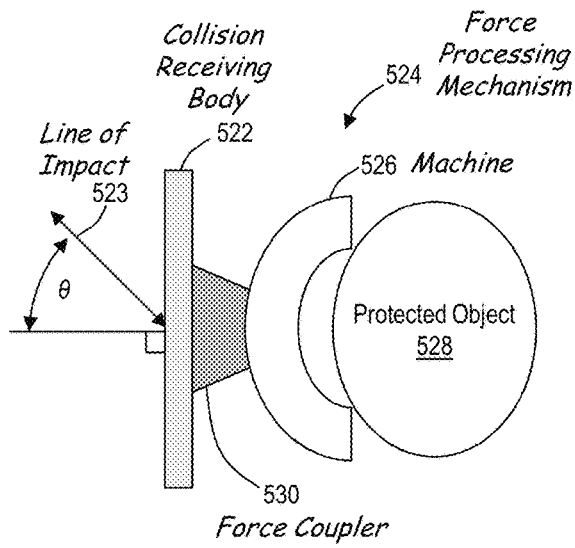

FIG. 5B depicts a schematic representations of another example of a collision protective system 520. The system includes a force processing mechanism 524 that includes a machine 526 and a force coupler 530. The force coupler is configured to couple or otherwise transfer at least a portion of an impact force of a collision receiving body 522 to one or more of the machine 526 and/or the protected object 528. In at least some embodiments, the force coupler 530 includes a mounting bracket or the like that supports the machine 526.

In one example, the force coupler 530 include a bracket or similar supporting feature that is fixedly attached to an interior surface of the collision receiving body 522. The machine 526 can be fixedly or moveably attached to the force coupler 530, e.g., allowing movement of at least a portion of the machine 526 with respect to the collision receiving body 522. For example, the force coupler can include a pivot anchor onto which one or more levers of an example machine 526 are pivotally attached. Operation of the machine 526 can be based at least in part on a location and/or angle of the collision with respect to the force coupler 530. A force applied above and/or below the force coupler 530 might actuate a first response of the machine 526, such as a rotation of a lever, whereas a force applied directly in line with the force coupler 530 might actuate a second response of the machine 526, such as compression of a leaf spring. It is understood that the machine 526 can include one or more modes of response that can depend at least in part on the type and/or position of the force coupler 530.

Figure 5C:
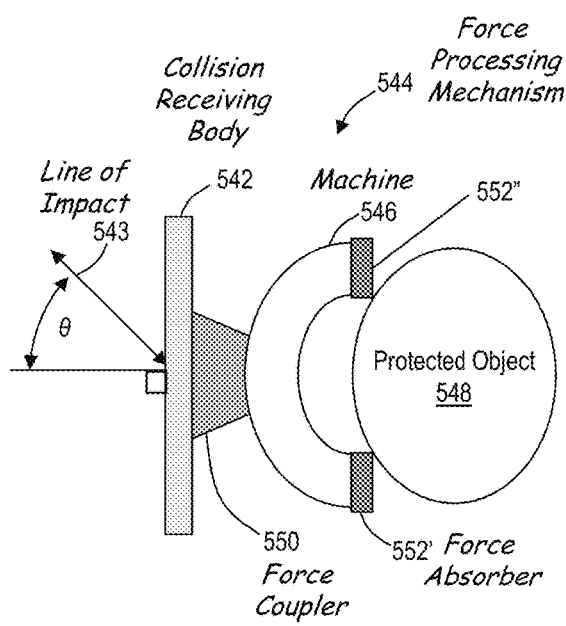

The illustrative example of FIG. 5C adds one or more force absorbers 552', 552", generally 552 to the force processing mechanism 544. In the illustrative embodiments, the force absorbers are positioned between a machine 546 of the force processing mechanism 544 and a protected object 548. The example force processing mechanism 544 also includes a force coupler 550 that transfers an impact force from a collision receiving body 542 to the machine 546. The impact force results from a collision of the collision receiving body with another object along a line of impact 543.

In operation, the force absorber 552 can mechanically deform to store kinetic energy related to the collision to a form of stored mechanical, e.g., potential energy. Examples of force absorbers 552 include, without limitation, resilient materials, such as foam or sponge pads, gels, airbags, deformable plastic pads, contained liquids, springs and the like. It is further understood that the force absorbers 552 can include compliant materials, such as gels, liquids, gasses, and the like that can be redistributed in response to kinetic energy of the collision. In at least some embodiments, the force absorbers 552 absorb energy according to a plastic region of deformation, e.g., up to a point of fracture.

Figure 5D:
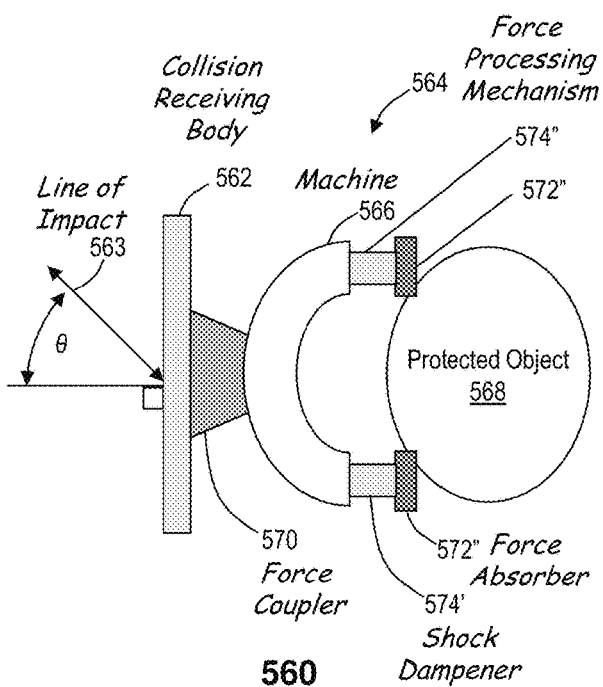

The illustrative example of FIG. 5D adds one or more force shock dampeners 574', 574", generally 574 to the force processing mechanism 564. In the illustrative embodiments, the shock dampeners 574 are positioned between a machine 566 of the force processing mechanism 564 and a protected object 568. The example force processing mechanism 564 also includes a force coupler 570 that transfers an impact force from a collision receiving body 562 to the machine 566. The impact force results from a collision of the collision receiving body with another object along a line of impact 563. Once again the force processing mechanism 564 includes one or more force absorbers 572', 572", generally 572, e.g., positioned between the shock dampeners 574 and the protected object 568. Absorption of at least some of the collision force can result in a slowing down or otherwise extending of an elapsed time of a response of the protective system 560 to a collision force. For example, compression of a resilient and/or crushable pad placed between the collision receiving body 562 and the protected object 568 can delay movement of the protected object, while also resulting in a reduced velocity when the protected object 568 is ultimately moved. The extension of the time and/or the reduced velocity both contribute to a deceleration that operates to mitigate the impact of a collision to the protected object 568.

Although the illustrations of the example embodiments may suggest particular arrangements of the various components of a protective components, it is understood that other orderings, configurations and/or arrangements are possible. For example, the shock dampener 574' and the force absorber 572' can be arranged in a series configuration, e.g., between the machine 566 and the protected object 568, as suggested by the illustrative embodiment 560. Alternatively or in addition, one or more of the shock dampener 574' and the force absorber 572' can be arranged in a parallel configuration, or even combinations of series and parallel. Alternatively or in addition, relative locations of components, such as the shock dampeners 574 and/or force absorbers 572 can include placement between one or more of the collision receiving body 562, the force coupler 570, and/or the machine 566.

In operation, the force absorber 572 can mechanically deform to store kinetic energy related to the collision to a form of stored mechanical, e.g., potential energy. The shock dampeners 574 dampen one or more of compression of the force absorbers 572 and/or actuation of the machine 566. Examples of shock dampeners include, without limitation, mechanical or hydraulic devices configured to absorb and damp shock impulses. The damping can be accomplished, e.g., by converting a kinetic energy of a shock into another form of energy, such as heat, which can then be dissipated. Examples include, without limitation, a mechanical device, commonly referred to as a dashpot that includes a damper that resists motion via viscous friction. The dampers can dissipate a non-trivial portion of energy of a collision force. Energy dissipation provided by the dashpots can include transforming a portion of a kinetic energy of a collision into thermal energy.

The force shock dampeners 574 can include one or more different types of mechanical dampers. For example, a dashpot is one example of a mechanical damper that resists motion via viscous friction. This can be achieved, e.g., using a cylinder containing a piston that is movable within a viscous fluid. The dashpot devices can be arranged in linear and/or rotary configuration. It is generally understood that force shock dampeners decelerate movement resulting from a collision. Accordingly, the force shock dampeners contribute to a slowing down of an elapsed time of an impact event.

Mechanical dampers can include one or more different mechanical response profiles. Example response files include, without limitation, directional sensitive response profile, a position sensitive response profile, and an acceleration sensitive response profile. For example, a direction sensitive mechanical damper can permit unrestricted motion, i.e., "fast" motion in one direction, while only permitting slow motion in an opposite direction. Such a response can be achieved, for example, by using a one-way mechanical bypass. Position sensitive dampers, e.g., including a piston, allow the piston to move relatively freely in a middle range of travel, sometimes referred to as a "comfort zone" while moving with significantly less freedom in response to more substantial shifts in position. It is envisioned that such position sensitive dampers could provide a comfort zone response that includes movement, jostling, and adjustment that might be experienced during normal usage, while providing a stiffer response to collisions beyond a particular magnitude. Acceleration sensitive dampers, e.g., including a piston and a compression valve, allow the piston to move relatively freely in a middle range of travel, sometimes referred to as a "comfort zone" while moving with significantly less freedom in response to more substantial shifts in position.

In at least some embodiments, the force processing mechanism 564 includes other components, such resilient pads, that when combined with dampers can alter or otherwise adjust a dampening response. For example, resilient pads can be combined with position sensitive dampers to establish or otherwise provide a threshold response between comfort zone and stiff responses.

Figure 6:
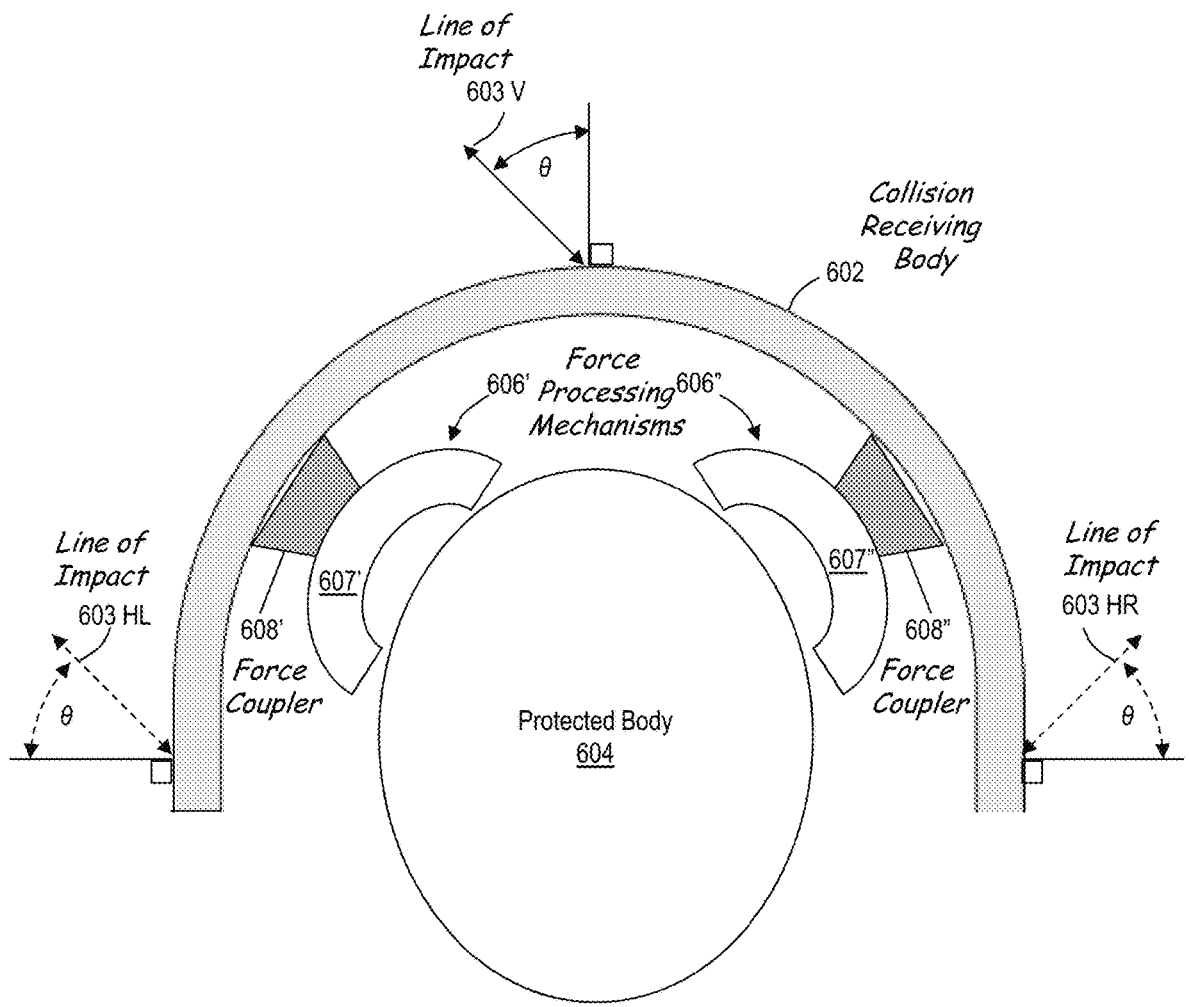
FIG. 6 depicts a schematic representations of another example of a collision protective systems.

FIG. 6 depicts a schematic representations of another example of a collision protective system 600. A collision receiving body 602 includes a shape or contour. The contour can be provided to facilitate protection of a shaped object, such as a human head, a torso, a limb, a portion of a vehicle, a portion of an architectural structure and the like. The illustrative example can be considered as a helmet shell 602 placed over at least a portion of a user's head 604. In the illustrative example, the helmet shell 602 provides protection to top and side portions of the user's head.

Any of the various configurations of the protective systems disclosed herein can take advantage of a shape of the protected item. A shape of one or more of the collision receiving body 562, the force coupler, the force processing mechanism 564 can be shaped and/or otherwise distributed with respect to the protected object 568. For example, a geometry of the padding elements 572 can include features, such as contours adapted to the protected object 568, and/or inclined planes, wedges, and/or resiliency responses that can operate to promote a motion of moving parts of the machine 566 to facilitate redistributing the force of the impact.

It is understood that one or more machine-type force processing mechanisms 606', 606", generally 606 can be positioned within an interior region of the helmet shell 602. In at least some embodiments, no portion of a machine-type force processing mechanism of a protective helmet system extends below a head portion and/or a neck portion of a body when the protective helmet system is work upon the head portion and/or the neck portion of the body. The illustrative example, each of the force processing mechanisms 606 includes a respective force coupler 608', 608", generally 608, associated with each of a respective machine 607', 607", generally 607. It is understood that more or fewer force processing mechanism 606 can be included to offer protection to the protected body 604 in response to collisions at various positions on the helmet shell 602 and/or along various lines of impact 603 V, 603 HL, 603 HR.

Figure 7:
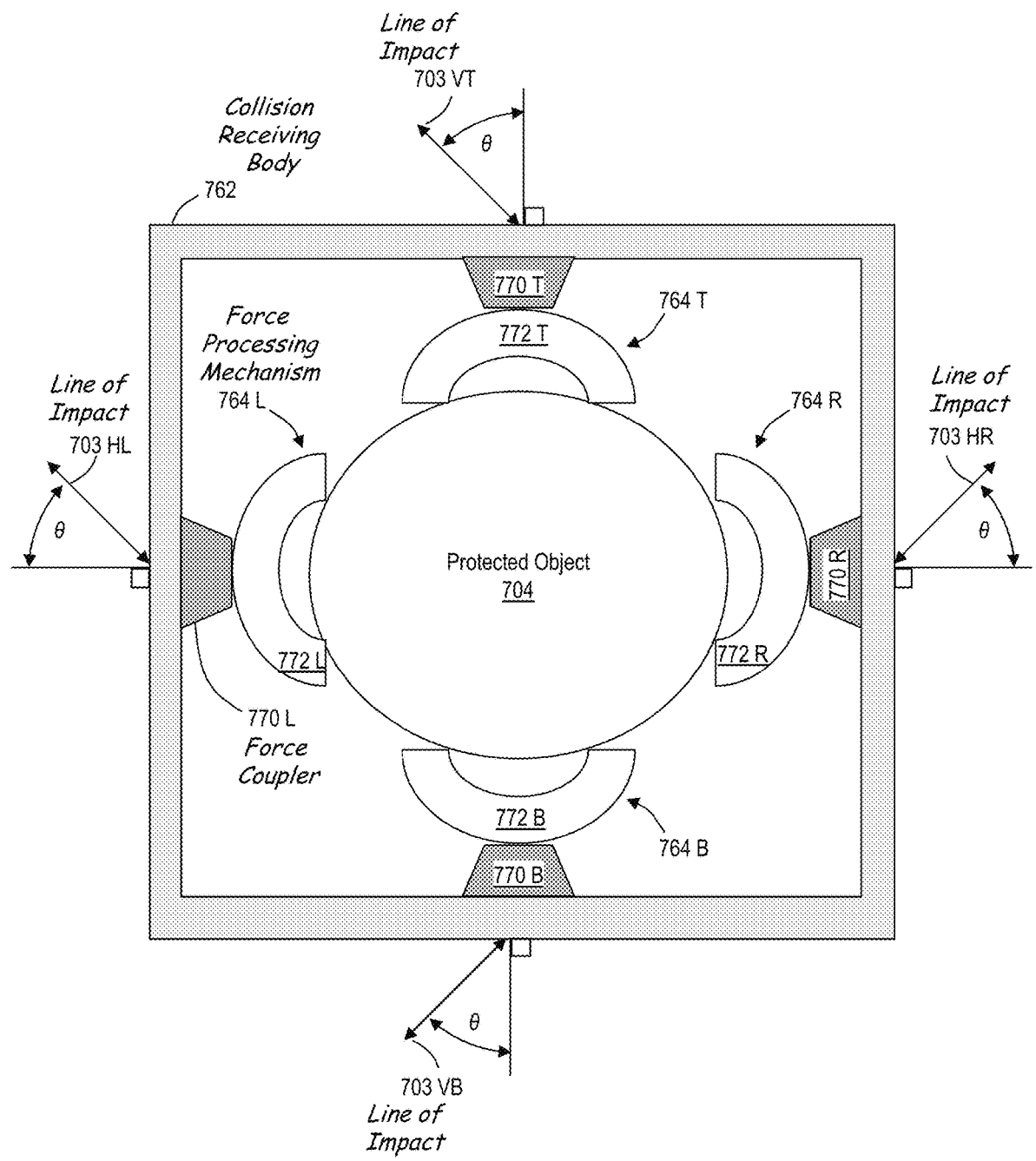
FIG. 7 depicts a schematic representations of yet another example of a collision protective systems.

FIG. 7 depicts a schematic representations of yet another example of a collision protective system 700 that includes a collision receiving body 762 that includes an enclosed surface. The illustrative example can be considered a vertical cross section showing front, rear, top and bottom side walls of a container system. In at least some embodiments, the container system can be a helmet system. It is understood that the container system can include a protective shell having left and right side walls that can include and/or be combined with respective force processing mechanisms. Although a rectangular structure is shown, it is understood that the techniques disclosed herein can apply to virtually any shaped container system, including cylinders, ellipsoids, spheroids, cubes, tetrahedrons, arbitrary shapes, and the like.

In the illustrative example, a protective shell of the container system represents a collision receiving body 762. The protected object 704 is positioned within an interior region of the container system 762. One or more force processing mechanisms are positioned between the protected object 704 and walls of the container system. In the illustrative example, at least one force processing mechanism 764 L, 764 T, 764 R, 764 B, generally 764 is positioned along each of the walls of the rectangular container system 762. The example force processing mechanisms 764 include respective force coupling mechanisms 770 L, 770 T, 770, R, 770 B, generally 770, and respective machines 772 L, 772 T, 772 R, 772 B, generally 772. Similar force processing mechanism can be provided for the front and back walls of the container system 762 (not shown).

In at least some embodiments, one or more of the system components can be merged and/or otherwise combined. By way of example, one or more portions of the force processing mechanism 764 can serve as the collision receiving body 762, without necessarily relying upon a separate component, such as a helmet shell. Consider a force processing mechanism 764 that includes multiple levers positioned about a user's head and held into place with a lever support structure. The levers may or may not include one or more of resilient pads and/or dampening mechanisms. The levers, however, can include a lever shaft provided in a pivotal arrangement with a fulcrum, e.g., provided by the lever support structure. The levers, depending upon size, number, orientation and/or location can effectively provide a shell.

In some embodiments, there may be openings and/or gaps between levers. Alternatively or in addition, the levers can include extensions, e.g., plates, that can be attached to the levers and/or otherwise integrally formed with the levers. In at least some embodiments, the plates can form a shell with gaps between plates of a sufficient dimension to allow for free movement of the levers in response to collisions impingent upon an external surface of one or more of the plates.

In some embodiments, the force processing mechanisms 764 are identical or similar, e.g., varying by size number and/or position. Alternatively or in addition, some of the force processing mechanisms 764 can differ. For example, one type of force processing mechanism 764 can be applied along a bottom and/or top wall of the container system, whereas, another type of force processing mechanism 764 can be provided along one or more of the side walls. Selection of the type and/or arrangement of the force processing mechanisms 764 can be based on anticipated collisions, weight and/or shape of the protected object 704, and the like.

FIGS. 8A-8D depict top perspective, bottom, front and side views, respectively, of an illustrative embodiment of a shock abatement system 800 including a lever assembly 801. The lever assembly 801 is part of a shock abatement system and/or a helmet suspension system that can be used in combination with a protective helmet wearable upon a portion of an animal body, e.g., a human head, a neck, a head and neck, and/or any portion thereof. The illustrative shock abatement system 800 can be used in combination with a substantially rigid, protective helmet shell. For example, the protective helmet shell can be molded or otherwise formed from a rigid material, such as a plastic, a composite, e.g., including a resin and a fibrous matrix, a metal, e.g., as used in armor, or any combinations thereof. It is understood that the protective shell, e.g., the helmet, without limitation, can include a single layer of material or multiple layers of material and provides an external surface that is configured to receive a collision force. The multiple layers of material can be of the same or similar materials or different materials. For example, materials with a structural orientation, such as materials including fibers, e.g., woven materials, can be layered having different orientations.

The direction, number, and/or magnitude of an applied, e.g., collision, force depends upon an intended application for the helmet. In some instances, it is possible to generally categorize protective gear into at least four general categories, including those intended for: (i) single impact, single direction; (ii) single impact, multiple directions; (iii) multiple impacts, single direction, and (iv) multiple impacts, multiple directions. It should be understood that the shock abatement systems and protective techniques disclosed herein can be applied to one or more of these categories.

The lever assembly 801 includes a mechanism that facilitates mitigation of impact forces upon a user. For example, the mechanism can include a force-redirecting mechanism that, when placed between the protective shell and the human body, facilitates redirection of a portion of the collision force transferred to the human body.

The illustrative example helmet lever assembly 801 includes four levers 806 disposed about a central axis, corresponding to a vertical axis of an upright, or standing, human body. Each of the levers 806, respectively, extends between a upper end 803 and lower end 804. The levers 806 are pivotally attached to a pivot ring 802 providing a plurality of fulcra pivotally attached to the plurality of levers 806 located between their respective upper and lower ends 803 and 804. When used with a protective shell, such as a helmet, the lever assembly 800 reacts to an applied force by pivoting one or more of the levers 806 about its respective fulcrum. It is believed that the pivoting action of the levers in reaction to in impulsive or impact force mitigate injuries to a human head, neck and/or back, when it is fully assembled. A vertical axis corresponding to a longitudinal axis of an upright human body or head is illustrated for reference. A vertical blow is primarily directed downward from above substantially along the vertical axis. Such impacts can result from falling objects, e.g., in a construction site and/or impacts resulting from the helmet being driven into another object, such as a beam, a mine shaft, and the like as might be caused by movement of objects and/or movement of a user.

In some embodiments, one or more of the levers can be configured to twist. For example, the twisting can be in response to a force applied to one or more elongated extensions at either or both ends of a lever assembly. In some embodiments, twisting is permitted by one or more of a mechanical configuration or a choice of material. Twisting of one or more of the levers can contribute to deformation of one or more deformable members, or springs, e.g., to convert a kinetic energy to a potential energy based on the twisting. In at least some embodiments, twisting includes a rotational displacement of one end of a lever with respect to an opposing end of the lever.

In at least some embodiments, one or more of the elongated portion of the lever and the extension are substantially rigid and joined by way of a linkage that facilitates a twisting. Alternatively or in addition, a twisting can be facilitated by a pivot about which the lever rotates. For example, the pivot can be flexibly mounted to one of a mounting frame and/or an interior surface of a protective shell or helmet. It is understood that one or more of the levers can include one or more joints, such as ball and socket joints.

In some embodiments, the lever assembly 801 can be assembled as a self-contained, wearable unit. In the illustrative example, the lever assembly 801 can be assembled into a free-standing assembly that can be worn with or without a protective shell. It should be understood that the shock abatement systems disclosed herein can be assembled into free-standing assemblies and used without protective shells. Such free-standing assemblies can be pre-assembled and inserted into or otherwise combined with protective shells. Alternatively or in addition the shock abatement systems can be combined with one or more protective shells and/or assembled in combination with such shells. In some embodiments, one or more components, e.g., the fulcra, can be attached to and/or integrally formed with the protective shell.

In the illustrative embodiment, the shock abatement system 800 includes an adjustment band 812 that includes an occipital support with adjustment mechanism of the ratchet kind. However other embodiments can use any of the available adjustment mechanisms and/or occipital supports. Alternatively or in addition, the adjustment band can include one or more other components to facilitate fitting and/or securing the shock abatement system 800. Examples include, without limitation, a strap, belt or pad(s) that conforms to a portion of the object being protected, such as an adjustable strap that conforms to anatomical portion of the body, e.g., an adjustable nape or chin strap.

The adjustment band 812 in this example embodiment can be made of a flexible material with high tensile resistance like plastic, e.g., polypropylene. This material can be injected, casted, press-cut formed, or the like, using known manufacturing techniques to fully form all the details of the grooves needed for the adjustment mechanism. However, other embodiments that use other adjustment mechanisms can use different means of manufacturing, such as punching. Any flexible material with relatively high tensile strength can be used like other plastics, leather, metals, foils, etc.

The adjustment band 812 is illustrated along an outer bottom end of at least some of the levers 804. It is understood that other configurations can include one or more adjustment bands, with at least some of the adjustment bands being fitted or otherwise placed along an interior or inner portion of the lever, along an exterior or outer portion of the lever, or along a combination of interior and exterior portions of different levers. For example, the lever 804 can be formed with an opening, such as a loop, a slot, a channel, and the like, to accommodate at least a portion of the adjustment band 812, e.g., as in a belt threaded through a belt loop of a garment. In at least some embodiments, the adjustment band 512 does not inhibit movement of the levers. For example, the adjustment band can be placed along and/or at attached to an interior region of the protective shell, without inhibiting movement of the levers.

Figure 9:
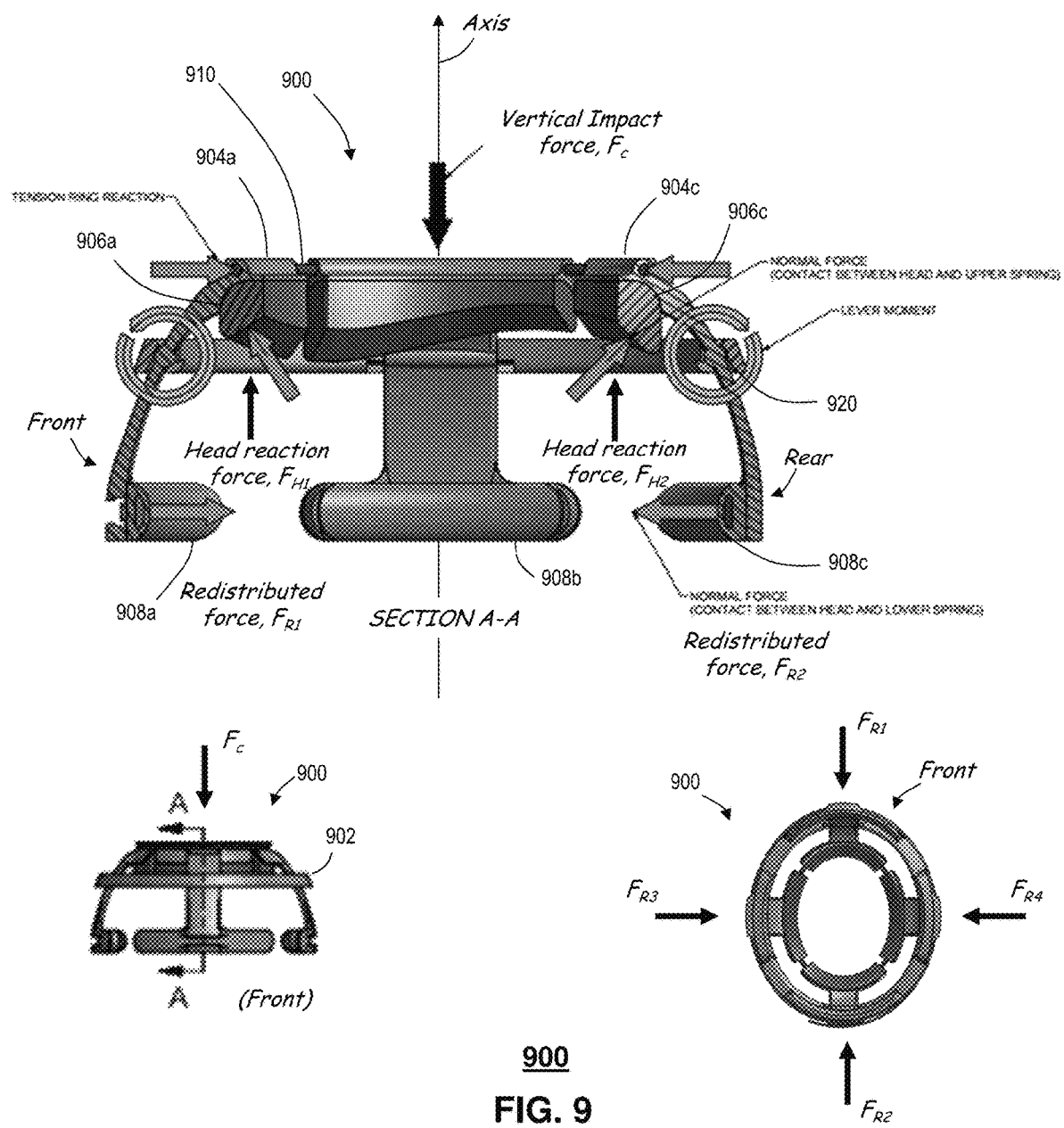
FIG. 9 depicts a sagittal plane cross-section of the elements system depicted in FIGS. 8A-8D.

In the example system 900 of FIG. 9, each of the levers 904, includes a respective top deformable member 906a, 906b, 906c, 906d, generally 906, disposed at a respective top end of each of the levers 904. Likewise, each of the levers 904 also includes a respective bottom deformable member 908a, 908b, 908c, 908d, generally 908, disposed at a respective bottom end of each of the levers 904. One or more of the deformable members 906, 908 can include a spring, a resilient material, a compressible material, a compliant material, a conformable material, or any combination thereof. Deformable materials can include, without limitation, spongy materials, foams, rubbers, polymers, gels, composites and the like. It is understood that one or more of the deformable members 906, 908 can be in contact with a portion of a body, such as a human head, face and/or neck. One or more of the deformable members 906, 908 can be configured to touch the body during normal wear, e.g., static use, during periods of reaction to external forces including impulsive or impact forces as might be experienced during a collision, and/or subsequent to any such collisions.

Each of the top deformable members 906, or more generally top attachments 906, can be attached to the first end, or top portion of each lever 904. The size, shape and or composition of each of the top attachments 906 can be sized, shaped and/or otherwise positioned to be in contact with an adjacent anatomical feature of the body. For the example helmet application, the top attachments 906 are sized and/or shaped to conform to a top or crown portion of a user's head. For example, the top attachments 906 can form part of the helmet shock abatement mechanism to facilitate action of the levers 904 in response to a substantially vertical impact received on an external surface of the helmet, while also offering an added measure of protection to the user. Namely, the top attachments 906 can be formed from a deformable material that can change shape, at least temporarily, under an impact to absorb energy, without injuring an adjacent region of the user's scalp. For example, the top attachments 906 can be formed from a resilient material.

Alternatively or in addition, one or more of the bottom deformable members 908, or more generally bottom attachments 908, can be formed from a resilient material and/or a compressible material and attached to the lower portion of each lever 904. The size, shape and or composition of each of the bottom attachments 908 can be sized, shaped and/or otherwise positioned to be in contact with an adjacent anatomical feature of the body. For the example helmet application, the bottom attachments 908 are sized and/or shaped to conform to a side portion of a user's head, e.g., a frontal or forehead region, a side or temple region and/or a rear or occipital region. It is understood that one or more of the bottom attachments can be configured to conform to multiple regions of a bodily anatomy, such as forehead-temple and/or temple-occipital, and the like. In at least some embodiments, one or more of the bottom attachments 908 can form part of the shock abatement mechanism to facilitate action of the levers 904 in response to a side or vertical impact received on an external surface of the helmet, while also offering an added measure of protection to the user. Namely, the bottom attachments 908 can be formed from a compressible material that can deform, at least temporarily, under an impact to absorb energy, without injuring an adjacent region of the user's scalp.

The shock abatement system 900 can include one or more springs, such as a top spring member 910 that absorb and/or store energy in response to movement of the levers 904. In the example shock abatement system 900, the spring member 910 includes an enclosed loop disposed along an outer facing surface of a top portion of each of the levers 904. The top resilient member 910 can include a spring and/or an elastomeric material, such as an elastic band, a rubber band, or a resilient O-ring. Although the illustrative examples portray an enclosed elastomeric loop, it is understood that any deformable material and/or configuration can be used. For example, a top portion of one of the levers 904 can be attached to a top portion of one or more of the other levers 904 by one or more springs. For example, springs can be used between adjacent levers 904, and/or between non-adjacent levers 904, e.g., between opposing levers 904. According to any of the example configurations, an impact or collision force induces a rotation of one or more of the levers 904, which results in a deformation of the one or more spring members 910 to absorb, and/or store, and/or dissipate mechanical energy of the impact/collision. It is understood that deformations of any of the various devices and/or materials disclosed herein, can include one of plastic deformations, elastic deformations, or any combination thereof.

In at least some embodiments, one or more spring members can be placed between the levers and the shell. Accordingly, when the levers move, energy may be absorbed by deformation of the springs. More generally, the spring members do not have to be limited to contact foams and/or o-rings. More generally, any other kinds of spring can be used. Such springs, in operation, can cooperate with action of the levers. It is understood that such spring members alone or in combination can facilitate a "threshold strategy" in which a type of mechanical response of the protective system can differ based on a magnitude and/or acceleration of a collision.

The spring member 910, without limitation, can include a tension spring having one or more of a coil spring or an elastomeric material, e.g., such as an elastic band. In the example embodiment the upper tension spring, 910, is an elastic or rubber O-ring about 4 mm in diameter. Other embodiments can use any spring or rubber like material that can work under tension that can absorb energy by deformation in a different direction than that of the vector of the original impact. In this embodiment extrusion is used to create a cylindrical rubber band that is later cut, e.g., at a 45 degree angle in each of its ends, and glued together using an epoxy adhesive to form an enclosed ring of a predetermined size and shape.

The top resilient member 910 can remain in tension and/or slack with respect to any and/or all of the levers 904 during normal periods of usage. Periods of use can be described generally as a static storage mode, a static use mode, and a dynamic impact mode. The static storage mode can include periods during which the helmet and/or shock abatement system is not placed on a portion of a body, e.g., during periods of non-use or storage. The static use mode can include periods during which the helmet and/or shock abatement system is placed on a portion of a body, e.g., during periods of usage or wear. The dynamic use mode can include periods during which the helmet and/or shock abatement system is placed on a portion of a body and exposed to external forces, such as exposed to during periods of impacts or collisions of the helmet with another object.

By way of example, in response to a vertically applied force, e.g., to a top portion of the helmet or head, the top portions of the levers 904 generally rotate outward, away from the central axis. Such outward rotation of the top portions of the levers 904 generally deforms the top resilient member 910 by stretching it. The stretching absorbs and/or otherwise stores kinetic energy of the lever rotation as potential energy by the expansion and/or compression of the resilient material of the top resilient member 910. In at least some embodiments, upon a removal of the vertical force, the potential energy stored in the top resilient member 910 can be transferred back to the levers 904 to induce a rotation that returns the levers 904 to a pre-stressed configuration.

In at least some embodiments, the shock abatement system can be configured with clasps, locks, catches, ratchet mechanisms or the like, to retain the levers in a rotated configuration, thereby preventing a transfer of potential energy stored in the top resilient member 910 back to the levers. Although the illustrative examples include transformations of a kinetic energy associated with a collision into a potential energy, e.g., by deformation of a resilient material, such as a spring, it is understood that other energy absorbing and/or dissipating techniques can be used. For example, energy of a collision force can include transforming a kinetic energy to one of a potential energy, a mechanical energy, a thermal energy, an acoustic energy, an electrical energy, a magnetic energy, or any combination thereof.

In the example system, each of the levers is substantially aligned in a plane that contains the central axis. Rotation of each lever can be substantially confined to this plane in a manner that controls positions of the top and or bottom attachments 906, 908 with respect to a user's head and/or neck. The pivot portions of the levers and/or the fulcra can be disposed in a plane perpendicular to the central axis. Accordingly, the example arcuate top portions 906, collectively, can form a first oval having a first size, e.g., small, during static modes of operation, and a second oval having a second size, e.g., large, during dynamic modes of operation. It is understood that either oval can include one or more gaps or spaces between adjacent top portions 906. Likewise, the example arcuate bottom portions 908, collectively, can form a first oval having a first size, e.g., large, during static modes, and a second oval having a second size, e.g., small, during dynamic modes of operation. Sizes and/or shapes of the ovals can be controlled by one or more of the sizes of the levers 904, positions of the pivots 920, size, shape and/or orientation of the top attachments 906 and/or the bottom attachments 908, and/or characteristics, e.g., size, shape, resiliency of the top spring member 910.

The levers 904 of the example shock abatement system 900 are curved to provide a concave surface facing inward towards the central axis. For the example helmet application, the shock abatement system 900 includes an open-ended interior region that is sized and/or otherwise shaped to accommodate at least a top portion of a user's head.

Beneficially, rotation of the levers provides several advantages that facilitate an abatement of the collision force acting upon the user's head and/or other parts of the body, such as the neck, spine and the like. For example, rotations of the levers reconfigured at least a portion of the downward or vertical force F into a different direction, e.g., a horizontal direction, pushing inward on side portions of the user's head. By using opposing levers, as in the illustrative example, the inward forces of the opposing levers tend to offset and/or balance to avoid lateral displacement of the user's head. Thus, at least a portion of the downward force F that would otherwise tend to compress a user's neck and/or spine is converted to opposing lateral forces that tend to compress the user's head 104, without necessarily moving and/or compressing the spine.

Moreover, that portion of the kinetic energy that is converted to potential energy in the spring is absorbed or otherwise prevented from acting upon the user's head or body. In the illustrative example, removal of the force F, e.g., after a collision, can result in a subsequent transfer of the potential energy of the spring into kinetic energy of the levers to rotate the levers back towards their original static use positions. Such backward rotation can result in a relative movement of the helmet and the user's head, e.g., to increase the separation distance therebetween. It is anticipated that such releases of potential energy will not result in forces that would otherwise injure the user.

FIG. 9 depicts a sagittal plane cross-section of the shock abatement system 900 depicted in FIGS. 8A-8D. In particular, an impulsive or collision force $F_c$ is shown directed downward, along the central axis. It is generally understood that the example helmet shock abatement system 900 fits within a protective helmet shell. A region of engagement between the shock abatement system 900 and the helmet shell (not shown) can occur along an outer surface, e.g., an outer slanted surface, of the mounting assembly, or pivot ring 902. It is further understood that in at least some embodiments, an open space is provided between portions of the shock abatement system 900 and an interior surface of the protective helmet shell. The open space is generally sufficient to allow a mechanism of the shock abatement system 900, such as the levers 904, to operate, e.g., pivot, about their respective axes without interfering with or otherwise being hindered by the protective helmet shell. Beneficially, the open space requires less material than might otherwise be required to reduce weight and/or to allow for air circulation, cooling and/or mitigation of perspiration.

In more detail, the downward collision force Fc pushes the protective helmet shell in a downward direction along the central axis (this can be viewed from a frame of reference of the helmet, in which it would appear that the user's head is moving upward, towards the point of impact). The downward movement of the helmet shell (upward movement of the head) urges the pivot ring 902 in the same, downward direction. The collision force result in multiple collision force elements applied through each of the resilient top portions 906 to the crown portion of the user's head. The head, in turn, provides head reaction force components $F_{H1}$, $F_{H2}$, generally $F_H$, operating against respective ones of the resilient top portions 906. The head reaction force components $F_H$ cause the top portions of the levers 904 to rotate upward and outward, e.g., the front lever 904a rotates counterclockwise, whereas the rear lever 904c rotates clockwise.

The outward rotation of the top portions of the levers 904 is accompanied by an inward rotation of the bottom portions of the levers. The inward rotation of the lower lever portions moves the lower compressible portions 908 inward towards the user's head. Namely, the lower portions of the levers induce inward redistribution forces $F_{R1}$, $F_{R2}$, $F_{R3}$, $F_{R4}$, generally $F_R$. In the illustrative example, a vertical collision force upon a top portion of a helmet shell that would tend to compress portions of a user's neck and/or spine is transformed into a lesser first annular force applied to a crown portion of the top of the head, a second lateral force directed inward towards the central axis, and absorption and/or storage of at least some of the kinetic energy of the collision by one or more of the deformable components and/or dampening or dispersive components. Beneficially, the lateral or inward directed forces do not compress the spine or neck of the user. Accordingly, the shock abatement system 900 transforms a substantially unidirectional, e.g., vertical, force into multiple component forces, e.g., perpendicular, over a variety of different directions, including directions that are at least 90 degrees from an incident direction of the collision force.

The pivot location or axis 920 can be located at a predetermined position along a length of the lever 904a. For example, the pivot axis 920 can be located centrally, substantially equidistant from either end of the elongated lever 904a. Alternatively or in addition, the pivot axis 920 can be located closer to one end or the other. It is understood that in at least some applications, the pivot location can be at one of the top and/or bottom ends of the lever 904. In the illustrative example, the pivot axis 920 is located closer to a top portion than a bottom portion of the lever 904a. In operation, the lever 904 rotates about the pivot axis 920. It is generally understood, as with lever machines in general, that a mechanical advantage can be obtained according to the location of the pivot position. For analytical applications, a mechanical advantage of a lever 904 can be equated to a transformer of an electrical circuit in which a driving voltage can be stepped up or stepped down according to the number of turns of the transformer windings. That is, the mechanical advantage or transformer effect can be controlled to increase or decrease a redistribution of a driving force based on a positioning of the pivot along the lever 904. A ratio of turns corresponds to placement of the pivot position along the lever.

In addition to mechanical advantage, lengths of travel of respective ends of the lever 904a when rotated about the pivot axis 920 can be controlled, at least to some degree, by placement of the pivot position or axis 920 along the length of the lever 904a. According to the illustrative example in which the pivot axis 920 is closer to a top portion of the lever 904a, the top portion will travel less than the bottom portion. Lengths of travel of the respective ends can be determined according to a product of a length between the pivot axis 920 and the respective end and an angular displacement of the lever measured in radians.

In some embodiments the pivot axes 920 of every lever of the lever assembly are positioned at a common distance from one end, e.g., the top, of the lever 904. In the example embodiment, the levers are substantially the same length, and the pivot axes are located at a common distance with respect to all levers of the lever assembly 904. Alternatively or in addition, one or more of the levers can have different lengths from the pivot axes 920 to the other ends of the lever, e.g., the bottom. In some embodiments, placement of the pivot axes differ among the levers 904. Such lever length and/or pivot location can be used to tailor a desired redistribution of forces in response to a driving, e.g., collision or impact force.

FIGS. 10A-10D depict a lateral view of the helmet shock abatement system 900 depicted in FIG. 9 in various stages of deformation when exposed to a vertical impact or collision force. FIG. 10A illustrates a side view of the shock abatement system 900 in a static mode at rest and without deformation, e.g., not placed on a user's head. The top portions of opposing levers 904a, 904c in the sagittal plane are separated by a first distance $d_{U1}$. FIG. 10D illustrates a corresponding separation of the bottom portions of the same levers 904a, 904c in the sagittal plane, $d_{L1}$. FIG. 10B illustrates a side view of the shock abatement system 900 in a static use mode, e.g., at rest upon a user's head. In the example configuration, the static use mode results in a relatively small deformation. Namely, the top portions of opposing levers 904a, 904c in the sagittal plane are separated by a second distance $d_{U2}$. FIG. 10D illustrates a corresponding separation of the bottom portions of the same levers 904a, 904c in the sagittal plane, $d_{L2}$. Likewise, FIG. 10C illustrates a side view of the shock abatement system 900 during a dynamic impact mode, e.g., responding to a vertically downward collision force Fc applied to a top of the user's head, which results in a relatively large deformation. The top portions of opposing levers 904a, 904c in the sagittal plane are separated by a third distance $d_{U3}$. FIG. 10D illustrates a corresponding separation of the bottom portions of the same levers 904a, 904c in the sagittal plane, $d_{L3}$. According to the example shock abatement system:

$$d_{L1} > d_{L2} > d_{L3} \qquad \text{Eq. 1}$$

and $$d_{U1} < d_{U2} < d_{U3} \qquad \text{Eq. 2}$$

It is understood that in some embodiments configurations of the static at rest and static use modes can be substantially the same, e.g., $d_{L1} = d_{L2}$ and/or $d_{U1} = d_{U2}$.

Figure 11A:
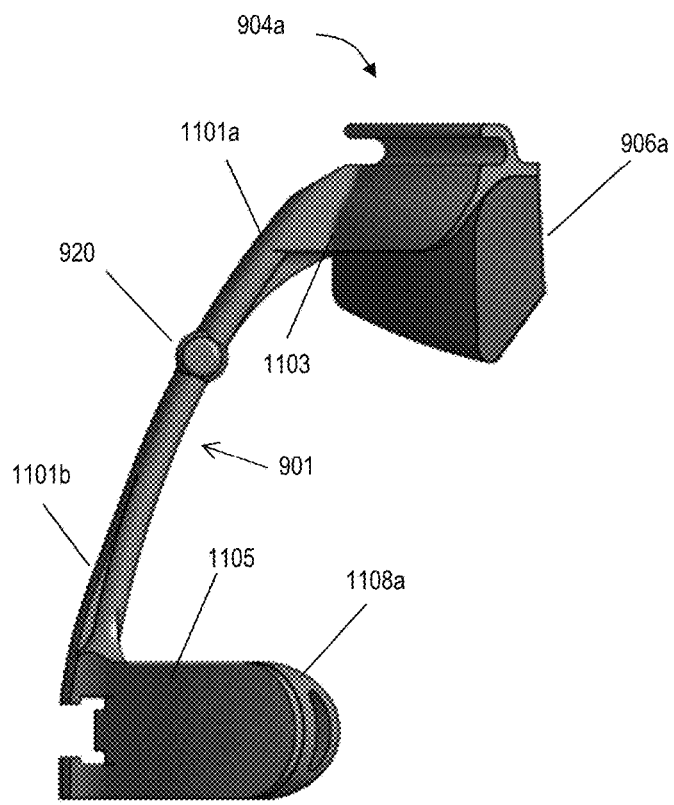
FIGS. 11A-11B depicts side views of a lever assembly of a lever array of the helmet system depicted in FIGS. 8A-8D.
Figure 11B:
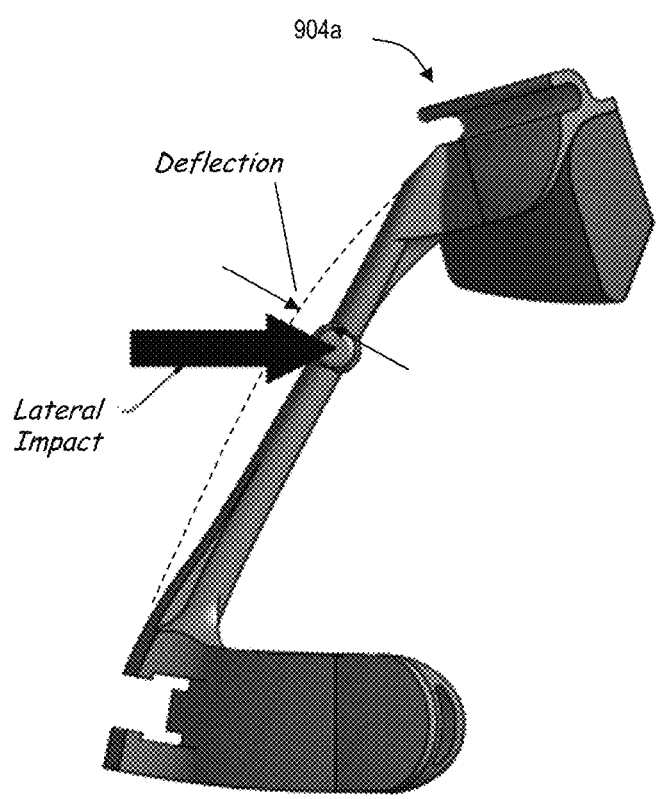
Figure 14A:
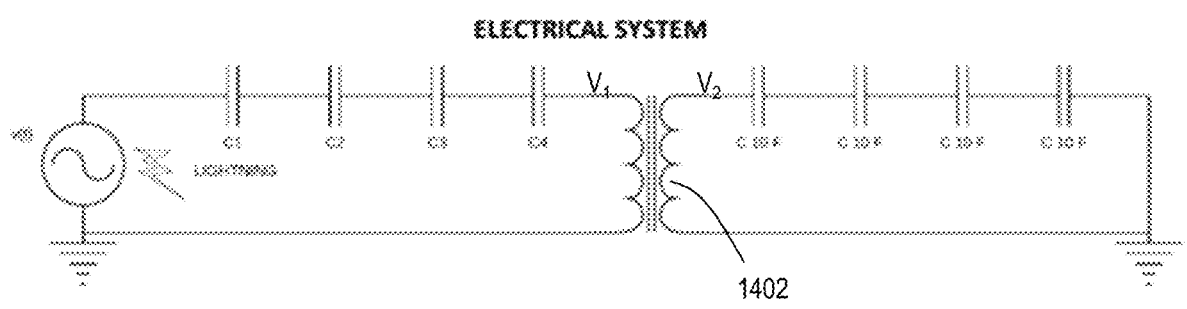

FIG. 11A depicts a side view of an example of a lever assembly 904a of the helmet shock abatement system 900 depicted in FIG. 9. In particular, the lever assembly 904a is in a normal, e.g., non-stressed configuration, providing a slight bow with an open concave portion facing the user's head when worn. FIG. 11B, depicts a side view of the lever assembly 904a of FIG. 11A subjected to a lateral force. Such a lateral force can be induced by a downward and/or side collision or impact to a protective system, such as a helmet containing the shock abatement system 900. In particular, the bowed length of the lever shaft flexes, bends or otherwise yields in response to the lateral force, providing a leaf-spring response. Namely, the bending of the elongated member 1101 results in a momentary displacement of a central portion or pivot 920 of the lever 904a, inward, towards the user's head. The inward distortion can transfer at least a portion of kinetic energy resulting from an impact into an absorbed, stored and/or otherwise dissipated energy. In at least some embodiments, more than one of the levers 904a, 904b, 904c, 904d provide similar leaf spring function. Namely, in response to a vertical force, the lever pivots about its pivot axis. Alternatively or in addition, in response to a vertical and/or lateral force, the lever deforms, e.g., bends, providing a momentary displacement of the upper and lower spring members with respect to the pivot axes. Such deformations occurring along a length of a lever 904 provide a leaf-spring response.

FIGS. 12A-12D depicts front, side, bottom and top perspective views of an alternative helmet shock abatement systems. Generally, the shock abatement system 1200 includes at least two sets of levers, or lever arrays. An upper lever assembly 1206 and a lower lever assembly 1216 are interspersed about a user's head when worn. The example upper lever assembly 1206 includes four levers 1204 rotatable about respective pivots 1202. The upper lever assembly 1206 includes a top spring 1205 in communication with a top end of each of the levers 1204 of the upper lever assembly 1206, and a bottom spring 1207 in communication with a bottom end of each of the levers 1204. Likewise, the example lower assembly 1216 includes four levers 1214 rotatable about respective pivots 1212. The lower lever assembly 1216 includes a top spring 1215 in communication with a top end of each of the levers 1214 of the lower lever assembly 1216, and a bottom spring 1217 in communication with a bottom end of each of the lower levers 1214. Each of the levers 1204, 1214 can be similar to the levers disclosed hereinabove, e.g., having an elongated lever arm extending between first and second ends, a pivot at a position along the lever arm between the first and second ends, one or more pivot extensions, upper and/or lower extensions to which resilient pads or springs can be attached, and the like.

The top and bottom springs 1205, 1207 react against pivotal rotations of the upper levers 1204. Namely, one or more of the top and/or bottom springs 1205, 1207 distort, e.g., stretch, in response to in impact force that causes a rotation of one or more of the upper levers 1204. Likewise, the top and bottom springs 1215, 1217 react against pivotal rotations of the lower levers 1214. Namely, one or more of the top and/or bottom springs 1215, 1217 distort, e.g., stretch, in response to in impact force that causes a rotation of one or more of the lower levers 2014.

In at least some embodiments, the one or more of the levers 1204 of the upper lever array 1206 also provides a leaf spring function. Namely, in response to a lateral force, the lever 1204 bends or flexes along its length providing a momentary displacement of the upper and lower ends of the lever 1204 with respect to the pivots 1202. The levers 1214 of the lower lever assembly 1216 can provide a similar leaf spring response to non-axial forces. Each of the pivotal and leaf spring responses can occur alone or in combination of one or more of the levers 1204, 1214. A particular response of any single lever can be determined by a direction of the collision, e.g., along the line of impact, and/or a response of one or more levers of the same lever assembly or a different lever assembly.

The first and second lever arrays 1206, 1216 can offer different responses based on their respective configurations. For example, levers 1204 of the first lever array 1206 can include a first pivot axis 1202 located at a first distance along the levers 1204 to provide a first mechanical advantage. Likewise, levers 1214 of the second lever array 1216 can include a second pivot axis 1212 located at a second distance along the levers 1214 to provide a second mechanical advantage. The first and second mechanical advantages can be the same or different. Alternatively or in addition, other features can be varied among and/or between levers of the different lever arrays 1206, 1216. Such features include, without limitation, lever lengths, lever shapes, lever materials, lever spring constants, lever pad sizes, and so on. In some embodiments, the levers are stacked and/or interlinked such that, in an event of an impact, at least some of the levers provide a leaf-spring response, while, at least some of the levers rotate about respective pivot axes. Such configurations provide a dual protection. For example, an impact may result in levers of an upper lever array rotating about their respective pivots. The same impact may result in levers of a lower lever array providing a leaf spring response. It is understood that one or more levers of one or more of the lever arrays can provide one or both of the rotational and bending responses in response to the same impact.

In some embodiments, a padding size, e.g., thickness, can be varied. Dimensions, shape and/or placement of the various pads used with the levers can be arranged to facilitate movement of the levers. Movement of the levers can include a first rotation in reaction to a downward force, and a second direction in reaction to a side force. Accordingly, one or more of the lever arrays respond to impact forces from one or more directions.

In some instances the levers rotate "down" from the crown of the head toward the sides of the head. Alternatively or in addition the levers can rotate "up" from the side of the head to the crown of the head. The particular rotation, including a combination of down and up rotations, generally depends upon a direction and/or a location of the impact force or forces. By allowing the levers to rotate in more than one direction, the shock abatement system is able to react to one or more forces applied along one or more various directions.

It is understood that the shock abatement system 1200 can be placed within a protective shell, such as a helmet shell. Alternatively or in addition, the shock abatement system 1200 can be used without a separate protective shell. In the latter configuration, a collision force would be received directly upon an exterior facing surface of one or more of the levers 1204, 1214. In either configuration, one or more of the levers respond to the collision according to the various response disclosed herein. For example, one or more of the levers 1204, 1214 can pivot and/or flex in response to the collision force.

FIGS. 13A-14A depict schematic diagrams of a mechanical and electrical analog of the helmet shock abatement system depicted in FIGS. 8A-8D. The example shock abatement system 1302 includes four levers 1304, each rotatable about a respective pivot axis 1308. The levers 1304 include top and bottom resilient pads 1310, 1312 or springs that interact with a head of the user (not shown). A mechanical system 1300 includes a first parallel arrangement of four springs 1320 corresponding to the spring members of the top portion of the levers, e.g., between a pivot position and a top attachment. Likewise, the mechanical system 1300 includes a second parallel arrangement of four springs 1322 corresponding to the spring members of the bottom portion of the levers 1304, e.g., between the pivot portion and the bottom attachment. An interaction of forces between the top and bottom portions of the levers can be controlled by the mechanical advantage of the levers, e.g., where the pivot axis 1308 is located along the lever 1304.

An electrical schematic diagram 1400 represents an electrical circuit corresponding to the mechanical schematic 1300 and the physical configuration of the shock abatement system 1302. Each of the four spring members of the top portion of the lever array 1302 is represented by a first group of series connected capacitors $C_1$, $C_2$, $C_3$, $C_4$. The capacitors store energy as do the mechanical springs. Likewise, each of the four spring members of the bottom portion of the lever array 1302 is represented by a second group of series connected capacitors. Once again, the second group of capacitors store energy as do the corresponding mechanical springs. Interactions between a left portion of the circuit and a right portion of the circuit is based on a central transformer 1402.

Depending upon a particular configuration of the transformer 1402, a first voltage $V_1$ applied to a left side of the transformer induces a second voltage $V_2$ at the right side of the transformer. A relationship between the first and second voltages can be controlled by the transformer to provide a step up in voltage, such that $V_2 > V_1$, or a step down, in which $V_2 < V_1$. Thus, positioning of the pivot point 1308 provides a transformation to the redistribution of impact forces resulting from a collision. Namely, the transformation leverages a mechanical advantage of the lever.

The levers of the foregoing embodiment can be described as being vertical levers. Namely, rotations of the levers about their fulcra occur within a vertical plane. It is understood that other embodiments can include one or more non-vertical levers, e.g., for which rotation occurs in a non-vertical plane. For example, a helmet application can include one or more levers that pivot in a horizontal plane, e.g., rotated about 90 degrees from the example levers disclosed herein. Other levers can be aligned in virtually any direction. Moreover, it is understood that levers of more than one orientation can be applied to a single application. For example, a helmet application can include one or more vertical levers, one or more horizontal levers, and/or one or more slanted levers that rotate in planes that are neither vertical nor horizontal.

FIGS. 13B-14B depict schematic diagrams of a mechanical and electrical analog 1340, 1440 of another embodiment of a helmet shock abatement system. This illustrative example, the shock abatement system includes dampers, such as dashpots $d_1$, $d_2$, $d_3$, $d_4$, $d_5$, $d_6$, $d_7$, $d_8$ associated with each of upper levers and lower levers of a lever assembly, e.g., similar to the helmet shock abatement system depicted in FIGS. 8A-8D, with the addition of dampers. The dampers can dissipate a non-trivial portion of energy of a collision force. Energy dissipation provided by the dampers can include transforming a portion of a kinetic energy of a collision into thermal energy.

Figure 13A:
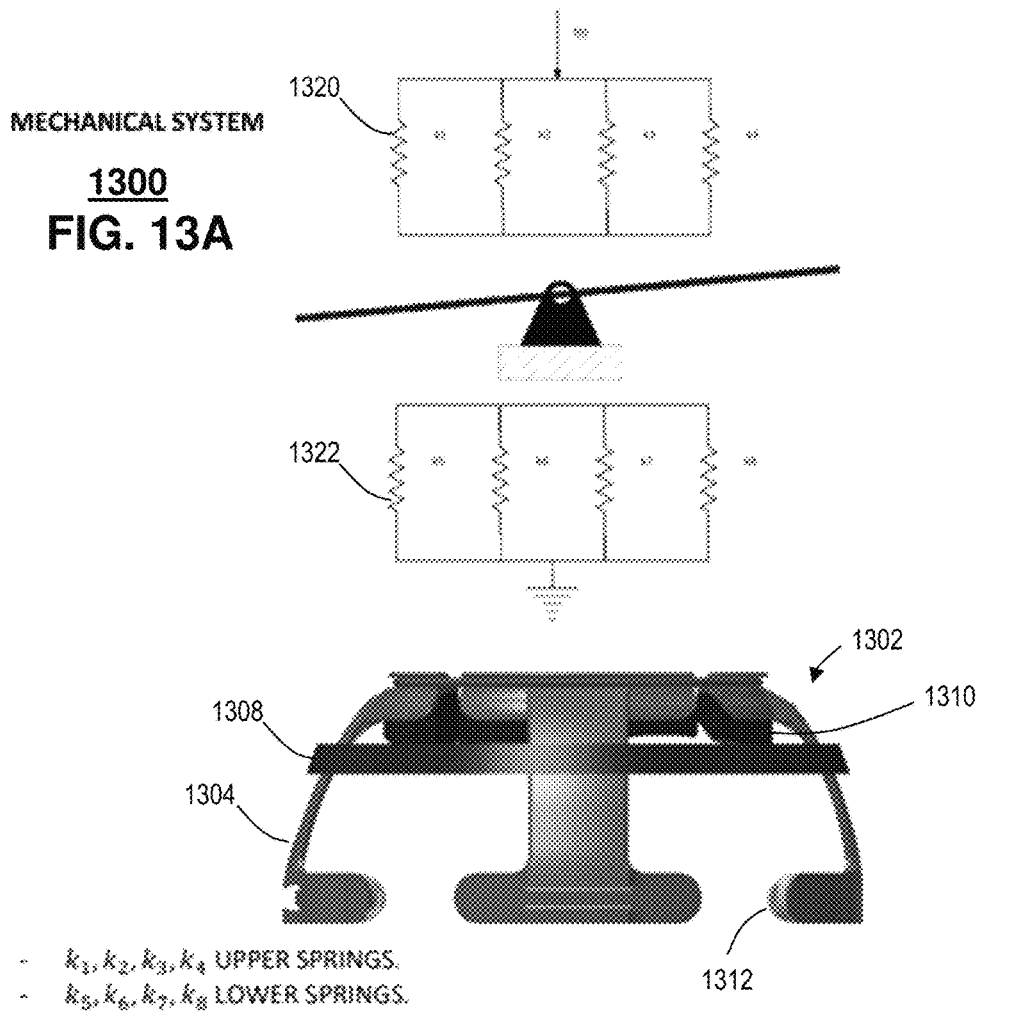
Figure 13C:
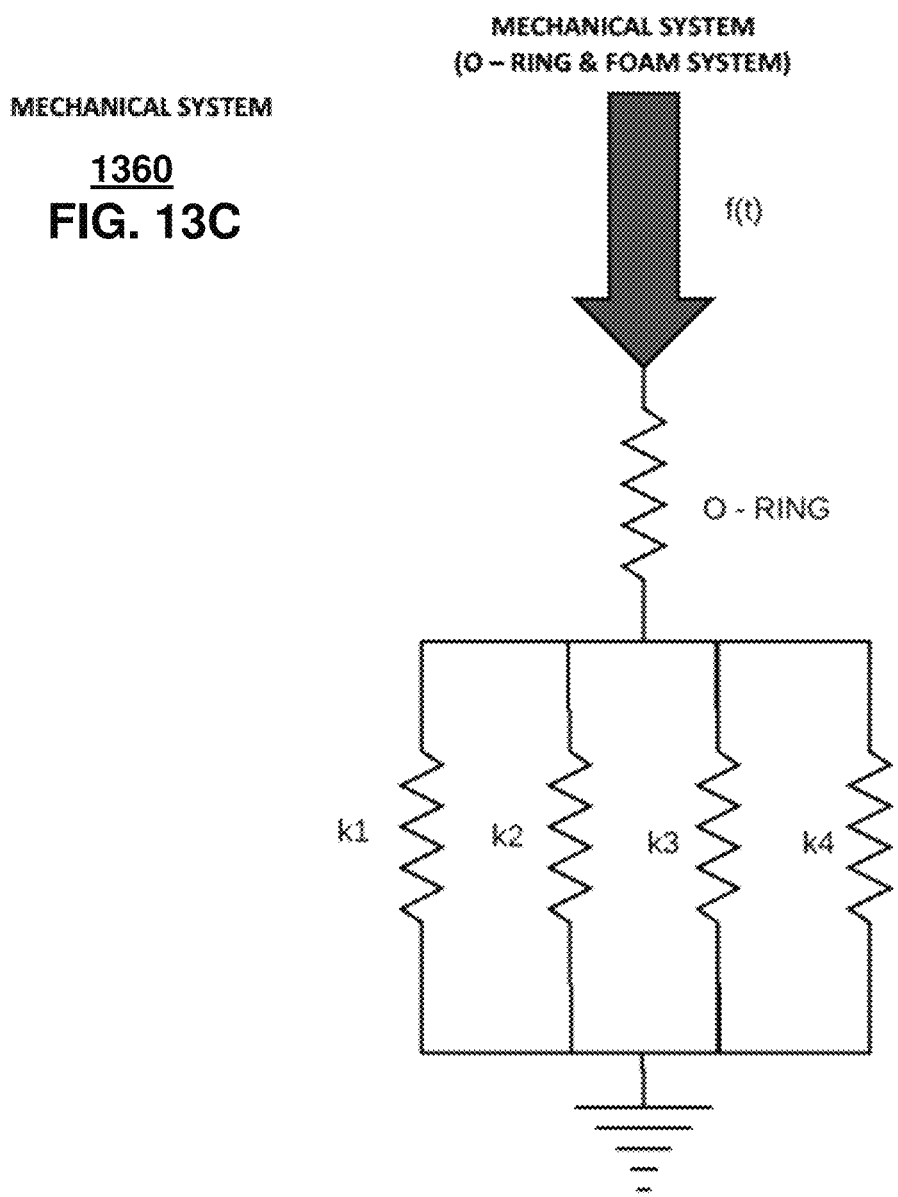

FIG. 13C illustrates a schematic diagram of another mechanical analog of another embodiment of a helmet shock abatement system. In particular, the illustrative mechanical analog 1360 includes provisions for an o-ring, such as the example o-ring in communication with upper levers of an example lever assembly. Other analogs are possible to accommodate any of the various example embodiments disclosed herein using well established techniques.

It is understood that one or more of the electrical schematic 1400 and the mechanical schematic 1300 can be used to evaluate any of the example systems disclosed herein, including various combinations of one or more of the individual features. In some embodiments, configurations or circuits, such as the example electrical 1400 and/or mechanical 1300 schematic diagrams can be used to synthesize particular system configurations, including one or more of system configurations and system component values, e.g., spring constants.

It is understood that virtually any material has an elastic region depending upon a magnitude of an applied force. Namely, an elastic deformation is a change in shape and/or size of a material induced by a relatively low stress that is recoverable after the stress is removed. A plastic region of deformation can be achieved in least some materials, by applying a relatively high stress, e.g., above or beyond the elastic region. It should be understood that such terms as used herein presume that the elastic regions of the materials fall within force ranges that allow the materials to be used for their elastic properties without causing damage or injury to a protected item, such as a human head.

Figure 15:
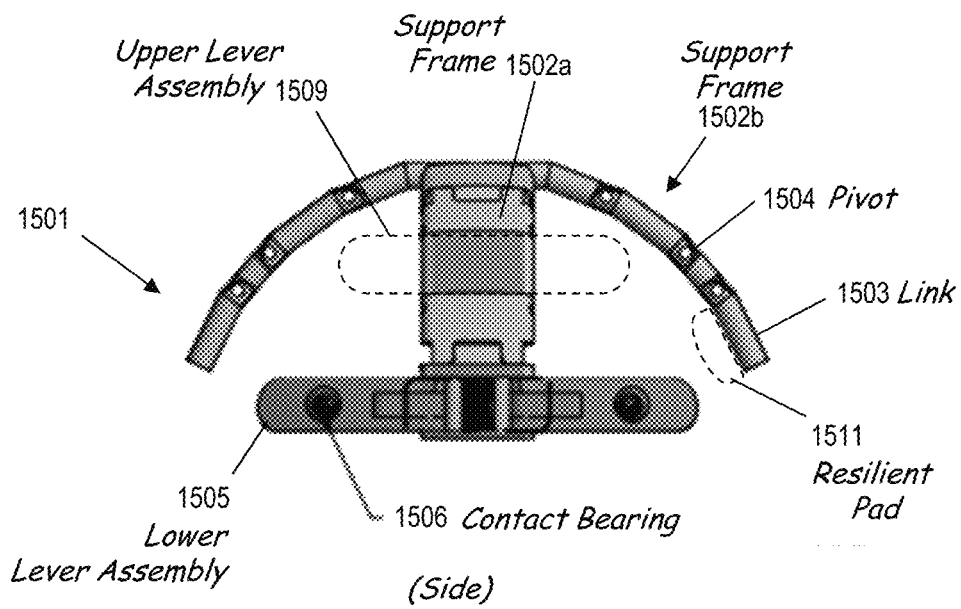
FIG. 15 depicts a side view of a floating shock-abatement system.

FIG. 15 depicts a lateral view of another embodiment of a force processing system that includes a floating suspension system 1500. The floating suspension system 1500, when positioned between a protected object 108, e.g., a body, and a collision receiving body 102 (FIG. 1), e.g., a protective member, facilitates a redistribution of an impact force transferred to the body via the protective member. The floating suspension system 1500 includes a contact mechanism, e.g., a contact point or bearing 1506 that frictionally engages an interior surface of the protective member. In operation, one of the suspension system 1500, the contact mechanism 1506 or both facilitate a shear displacement between the protective member and the suspension system 1500 in response to the impact force. Beneficially, an impact force that induces a rotational acceleration of the protective member, such as a helmet shell, can be absorbed and/or deflected to at least some extent by the shear or rotational displacement offered by the floating suspension system 1500.

In some embodiments, the floating suspension system 1500 engages an interior surface of a collision receiving body, e.g., a helmet, according to a relatively low friction. Such low frictional engagements can include smooth surfaces, low friction materials, such as PTFE, wheels, rotating bearings, and the like. Alternatively or in addition, the floating suspension system 1500 engages the interior surface of the collision receiving body according to a relatively high friction. Such relatively high frictional engagements can include non-smooth, or rough surfaces, e.g., having one or more of grooves, bumps, ridges and the like.

In at least some embodiments, one or more frictional engagements include an inclined plane. For example, the contact bearing 1506 abuts an inclined plane along the interior surface of the helmet. As the lever assembly 1505 rotates with respect to the helmet, the contact bearing 1506 moves along the inclined plane. Consequently, a frictional force related to the shear displacement can vary according to a position along the inclined plane.

It is further understood that at least some embodiments can include other features that limit a range of shear displacement. For example, such features can provide interference that slows or otherwise prevents relative shear displacement beyond a predetermined range. Such features can include one or more of stops, ridges, walls, grooves, and the like.

In more detail, the floating suspension system 1500 includes a support frame 1501 and a lever assembly 1505 supported by the support frame 1501. In the illustrative example, the support frame 1501 includes a first support frame assembly 1502a and a second support frame assembly 1502b, generally 1502. Each frame assembly 1502 of the support frame 1501 can be shaped in a form of an arc, e.g., a frontal arc frame assembly 1502b, sized and shaped to accommodate a fit to the protected body, e.g., fit a portion of a user's head in the illustrative helmet example. In at least some embodiments, multiple arc frame assemblies 1502 can be provided, e.g., including a sagittal arc and a frontal arc rotationally displaced from each other by a non-zero angle about a central axis. In some embodiments, the non-zero angle is about 90 degrees, but could be any other angle, e.g., 20 degrees, 45 degrees, 60 degrees, and so on, without limitation.

In some embodiments one or more of the arc frame assemblies 1502 are substantially rigid. For example, the arc frame assemblies 1052 can be formed from a rigid material, such as a rigid polymer, a rigid composite material, a metal, and the like. Alternatively or in addition, the arc frame members 1502 can be semi-rigid and/or flexible.

The example lever assembly 1505 includes a pair of opposing lever arms 1507a, 1507b, generally 1507, rotatable about a common axis or pivot 1509. The lever arms 1507 can include one or more resilient members, e.g., pads 1514a, 1514b, generally 1514. In the illustrative example, the pads 1514 are configured to abut a portion of a user's head during usage. Alternatively or in addition, one or more other resilient members, e.g., pads 1511 can be attached or otherwise provided at one or more locations along one or more of the arc frame members 1502 separate and apart from any of the lever assemblies 1505.

The lever assembly 1505 can be mounted to the arc frame assembly 1502 at predetermined locations in relation to the protected body, e.g., the user's head. In the example embodiments an elongated axis of the lever assembly is positioned transverse to an elongated member of the arc support frame. It is understood that more than one lever assembly 1505 can be mounted to each arc support frame 1502. For example, the lever assemblies can be provided in opposing pairs, such that one lever assembly on a right side of the user's head is balanced by another lever assembly on a left side of the user's head. Likewise, one or more such pairs of lever assemblies can be mounted on each frame of a multi-arc frame configuration. It is understood that the opposing lever assemblies of one arc frame can be positioned interdigitally with respect to other opposing lever assemblies of another arc frame. Such interdigital placement allows the levers to be placed at predetermined locations about the user's head without interfering with each other.

Figure 16:
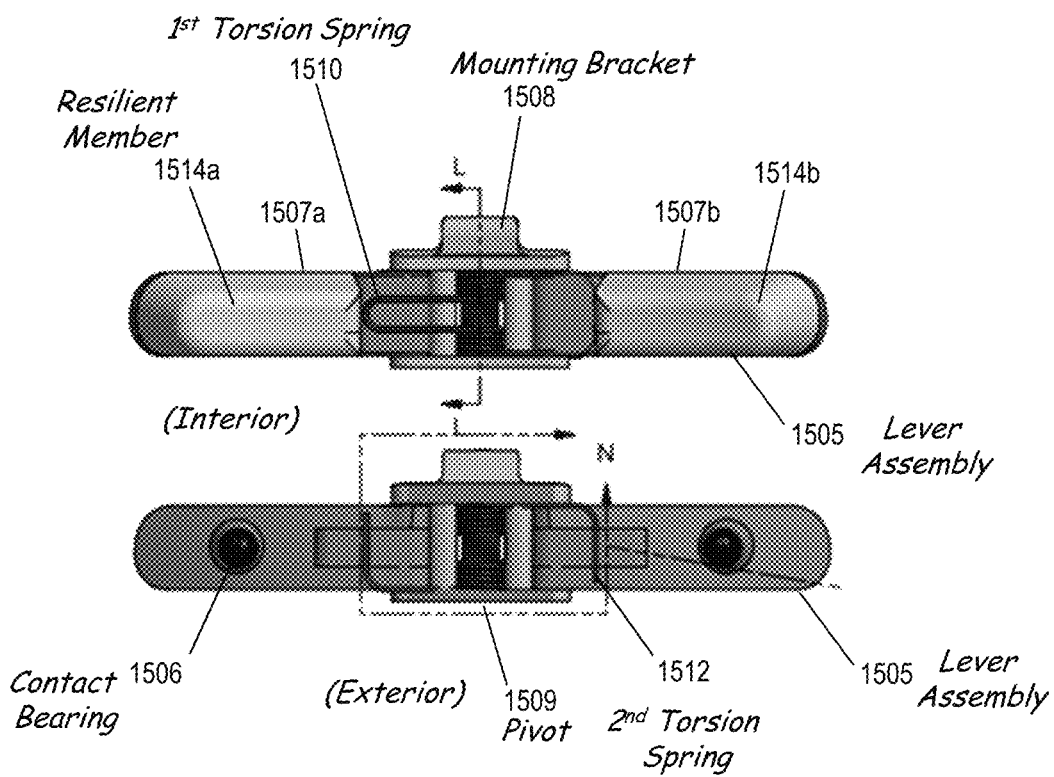
FIG. 16 depicts interior and exterior views of a lever assembly of the floating shock-abatement system of FIG. 15.

FIG. 16 depicts more detailed interior and exterior side views of an example lever assembly 1505 (FIG. 15). The lever assembly 1500 of the illustrative example, can be mounted at one or more of various locations of the arcuate support frames 1502. For example, the lever assembly 1505 can be mounted along a lower region of the arcuate support frame 1502, e.g., using a mounting bracket 1508, as shown, and/or along an upper region 1509 of the same and/or different frames 1502. Referring again to FIG. 15, the support frame 1501 can include one or more segmented arc frames 1502, in which at least one arc frame 1502 is formed from multiple arc segments or links 1503. The multiple arc segments 1503 can be joined along hinges or pivots 1504 to allow the individual arc segments 1503 to bend and/or rotate with respect to other arc segments 1503 of the same arc frame member 1502. In some embodiments, a spring, such as a torsion spring (not shown) is provided along one or more joints 1504 of the arc segments. Alternatively or in addition, a dampening mechanism can be provided along one or more of the joints of the arc segments.

An external facing surface of the lever assembly 1600 includes one or more contact mechanisms positioned to interact with an interior surface of a protective shell, or helmet. The contact mechanism can include a slideable structure that provides a slideable engagement between the suspension system 1600, the contact mechanism, or both, and the interior surface of the helmet. The slideable structure can include a slippery surface that provides a low-friction interface to the interior surface of the protective member. The slippery surface can include a rounded or smooth structure. The rounded or smooth structure can include a relatively low friction material, such as a PTFE or the like. In some embodiments, the contact mechanism includes a rollable structure that provides a rolling engagement between the one of the suspension system, the contact mechanism or both and the interior surface of the protective member. Examples of rollable structures include, without limitation, wheels, casters, bearings, ball bearings or any combination thereof.

In some embodiments, the lever assembly 1505 includes opposing levers that rotate in opposition about a common pivot axis 1509 in response to the impact force. The lever assembly 1505 can include a deformable, e.g., resilient, mechanism, such that a rotation of the opposing levers, e.g., in response to an impact force, deforms, e.g., compresses, the resilient mechanism. In the illustrative embodiment, the resilient mechanism includes a first torsion spring 1510, presenting a first spring constant in response to a compressive force that closes the lever assembly. Alternatively or in addition, the resilient mechanism includes a second torsion spring 1512, presenting a second spring constant in response to a decompressive force that opens the lever assembly. One of the first torsion spring 1510, the second torsion spring 1512, or both, can include a coil spring, as illustrated. In some embodiments, the first resiliency differs from the second resiliency according to the respective spring configurations, e.g., spring constants. Still other configurations can include, without limitation, springs, tension/extension springs, compression springs, torsion springs, flat springs, serpentine springs, cantilever springs, coil springs, leaf springs, wave springs, solid materials, shaped materials, elastomers, e.g., elastomeric loops, natural materials, e.g., rubber, synthetic materials, e.g., polymers, and the like. It is also understood that of the foregoing variants can be used with and/or without dampening assemblies.

Figure 17:
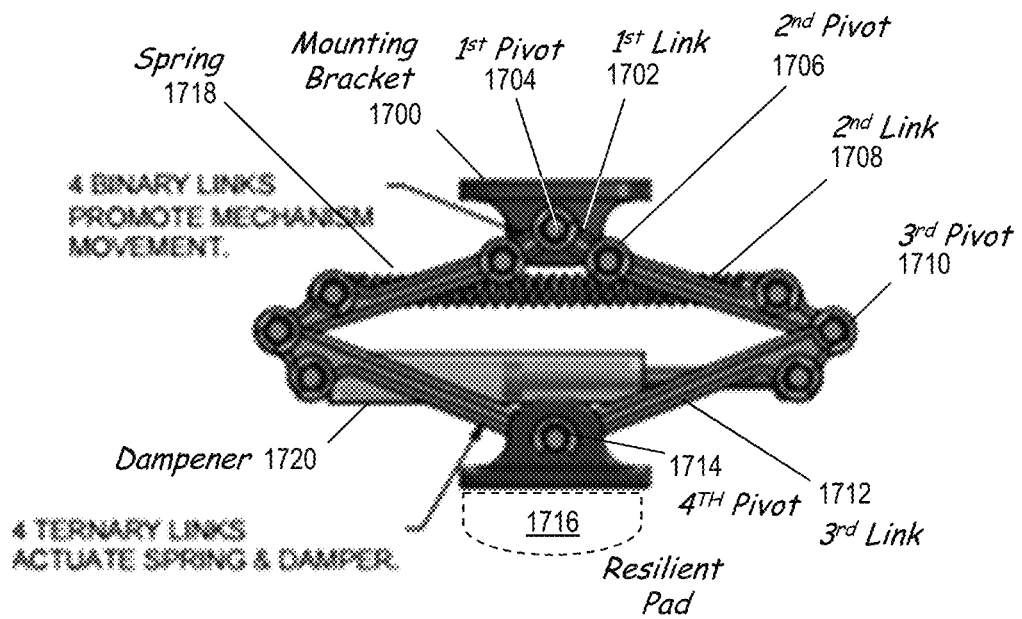
FIG. 17 depicts an example of a component of an embodiment of a shock-abatement system.

FIG. 17 depicts an example of a suspension assembly 1700 of an embodiment of a force processing system 106 (FIG. 1). The suspension assembly 1700 can be used alone or in combination with any of the other example suspension systems disclosed herein. For example, the suspension assembly 1700 can be mounted to one or more of the support frames, such as the arcuate support frames of the preceding example 1502 (FIG. 15). The suspension assembly 1700 can be positioned between the frame 1502 and the protected body, and/or between the frame 1502 and the collision receiving member or shell, and/or along both sides of the frame. For example, the suspension assembly 1700 can include one or more resilient pads 1716 that can abut a user's head during use. In at least some embodiments, the suspension assembly 1700 can be mounted to the collision receiving member and/or used alone or in combination with components that would allow shear translations, such as wheels, bearings, and the like. However, whereas the preceding examples included open-ended, e.g., scissor-style, levers, the present suspension assembly 1700 provides an enclosed arrangement of pivotally joined rigid links.

A first link 1702 is pivotally joined between a first pivot 1704 and a second pivot 1706. A second link 1708 is pivotally joined between the second pivot 1706 and a third pivot 1710. A third link 1712 is pivotally joined between the third pivot 1710 and a fourth pivot 1714. The first, second and third links 1702, 1708, 1712 can form half of an enclosed linkage, such as shown in the illustrative configuration 1700. The example six links form the example can be said to form an enclosed linkage, e.g., the linkage are arranged to form a closed structure, such as a polygon. It is understood that other numbers and/or configurations of linkages are possible, including open-ended linkages. Examples of open-ended linkages include any of the example scissor-type machines disclosed herein. The links 1702, 1708, 1712 are pivotally joined to provide a separation or compression of an open interior region of the enclosed lever assembly in response to external forces. The lever assembly can include one or more spring members 1718 that store energy and/or one or more dissipating elements 1720, such as dampers, to dissipate energy during an exchange between kinetic and potential energies of the spring.

Figure 18:
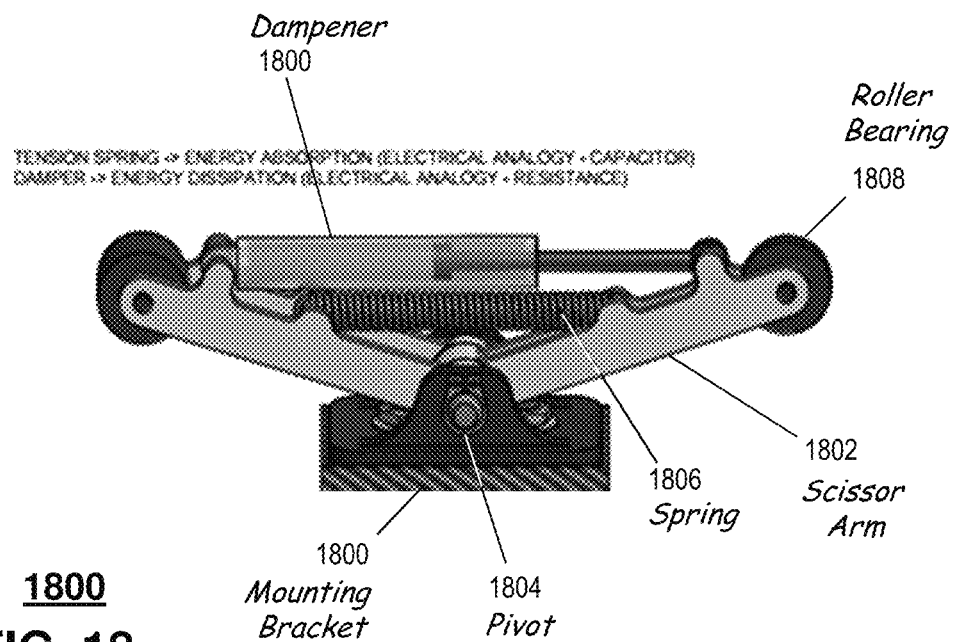
FIG. 18 depicts an example of a component of another embodiment of a shock-abatement system.

FIG. 18 depicts an example of another suspension assembly 1800 of an embodiment of a force processing system 106 (FIG. 1). The suspension assembly 1800 can be used alone or in combination with any of the other example suspension systems disclosed herein. For example, the suspension assembly 1800 can be mounted to one or more of the support frames, such as the arcuate support frames of the preceding example 1502 (FIG. 16). The suspension assembly 1800 can be positioned between the frame 1502 and the protected body, or between the frame 1502 and the collision receiving member or shell, or along both sides of the frame. The suspension assembly 1800 can be mounted to the collision receiving member and/or used alone or in combination with components that would allow shear translations, such as wheels, bearings, and the like.

The suspension assembly 1800 includes opposing levers or scissor arms 1802 that rotate in opposition about respective pivot axis 1804 in response to an impact force. For example, an impact force applied to an external surface of a protective shell compresses one or more of the lever assemblies 1800, e.g., when attached to a support frame 1502 (FIG. 5) between the user's head and the protective shell. In the illustrative embodiment, the compressive force enacts the levers 1802 by opening the levers 1082. A resilient member, such as a spring 1806 can be attached between the levers 1802 such that a compressive force that opens the levers 1802 results in energy being stored in the spring 1806. Upon removal of the impact force, the spring 1806 can transfer stored energy back to the levers 1802 causing them to move in a closing direction.

In some embodiments a lever-based force processing system 106 (FIG. 1) includes a first lever mechanism 1800 coupled to a first arcuate member 1502a providing shear displacement along a first baseline of the first arcuate member via the contact mechanism, and a second lever mechanism 1800 coupled to the second arcuate member 1502b that provides shear displacement along a second baseline of the second arcuate member via the contact mechanism. The shear displacement can be facilitated by a rolling member, such as a wheel 1808, a numb or bearing, a ball bearing or a caster disposed at distal ends of the levers. Pivoting about a pivot 1804 at a proximal end of the levers 1802 causes the levers 1802 to open and/or close resulting in a rolling engagement between the rolling members 1808 and an interior surface of the shell. In at least some embodiments, the suspension assembly 1800 includes a dampening mechanism 1810, e.g., positioned between open ends of a pair of levers 1802. The dampening mechanism can provide some measure of shock absorption in response to rapid movements of the levers 1802

By way of illustration, a lateral force applied to a left side of a helmet compresses lever assemblies 1800 along a left side of the user's head, e.g., opening the levers 1802, causing the springs 1806 to store potential energy along the left side of the user's head. Relative movement between the user's head and the helmet results in lever assemblies 1800 along an opposing, right side of the user's head to reduce compression of the lever assemblies along a right side of the user's head, e.g., closing the levers 1802, causing the springs 1806 to release potential energy along the right side of the user's head. The potential energy released by the lever assemblies along a side of the user's head that is opposite to the impact location, act to apply an inward force to the opposite side of the user's head. Accordingly, an impact force along a first direction results in a first reaction force applied along the same direction as well as a second reactive force acting in an opposing direction. Once again, an impact force at one position results in an application of inward forces acting in opposing directions.

It should be understood that any of the suspension systems disclosed herein can use the protective shell, e.g., helmet, as a displacement mechanisms that facilitates a relative displacement of the body to the protective shell in a direction that opposes a direction of the impact. Such displacements can contribute to a slowing down of a relative movement of the body with respect to the protective shell. Such displacement mechanisms can isolate the shell from the head thereby providing a measure of protection from an impact force applied to the shell.

In some embodiments, the suspension system includes a compressive member positioned adjacent to the body during use. For example, the compressive member can be positioned between the user's head and an interior surface of the arcuate frame members. The compressive member can include any of the compressive and/or resilient materials disclosed herein. Examples include, without limitation, a spring, a foam, a sponge, an elastomer and any combination thereof.

Figure 19A:
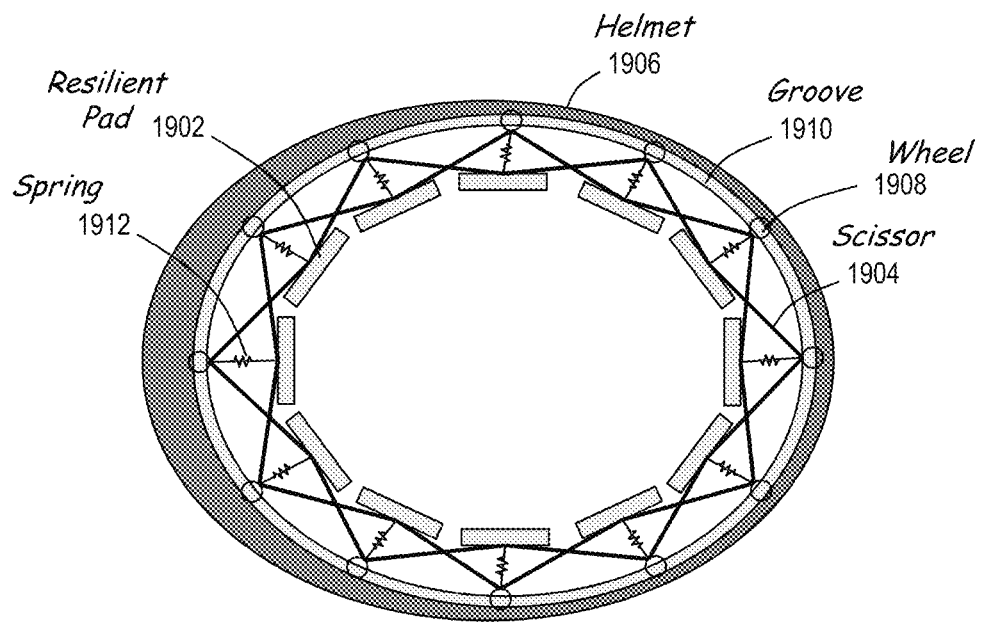
FIGS. 19A-19B depict bottom and side views of an embodiment of a helmet system.
Figure 19B:
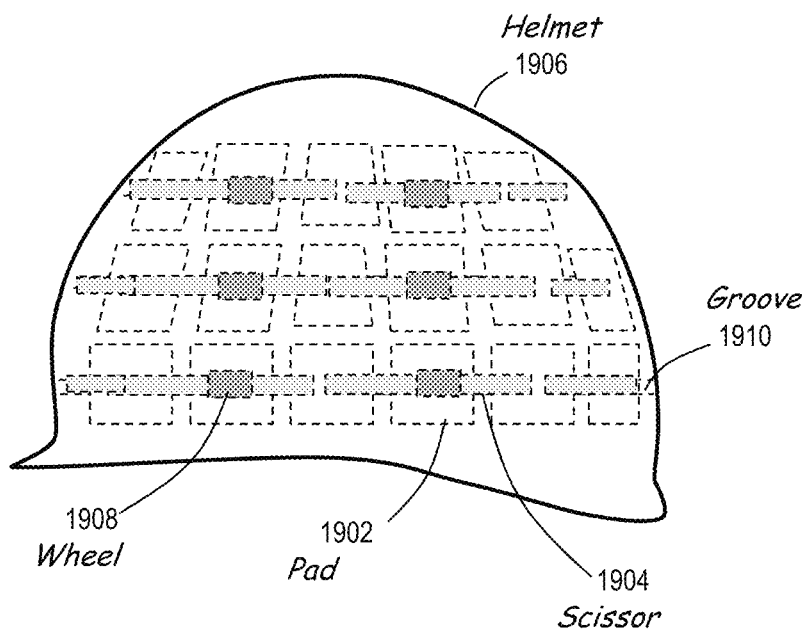

FIGS. 19A-19B depict bottom and side views of an embodiment of another helmet suspension system 1900. The suspension system 1900 includes an array of pads 1902 disposed around a user's head. An array of lever, e.g., scissor assemblies 1904 are provided between the array of pads 1902 and an interior surface of a helmet shell 1906. The scissor assemblies 1904 can include rigid, semi-rigid, and/or flexible lever arms rotationally joined together, e.g., along a pivot axis, to rotate in a scissor-like fashion about the pivot axis. In some embodiments, each lever of the pair of lever arms includes a resilient pad 1902. The resilient pad 1902 is positioned, attached and/or otherwise integrally formed at a position along the lever arm that brings the pad 1902 into contact with a user's anatomy during use. In some embodiments, at least some of the scissor assemblies 1904 are independent, e.g., in that operation of one scissor assembly 1904 can occur without interrupting another scissor assembly 1904. Alternatively or in addition, one or more of the scissor assemblies 1904 can be interlinked and/or otherwise configured so that operation of one of the scissor assemblies 1904 induces a response in at least one of the other scissor assemblies 1904. For example, one end of adjacent pairs of scissor assemblies 1904 can be applied to, joined and/or other otherwise attached a common pad 1902.

In some embodiments, a pivot axis of at least one of the lever assemblies 1904 can be positioned along an outer portion of the helmet suspension system, such that an opening formed by the scissors 1904 faces a user's head. For example, the pivot can be located at a wheel 1908 configured to roll along an interior surface of the helmet shell 1906, while outer ends of the lever arms can contact resilient pads 1902 that abut the user's head. Alternatively or in addition, the pivot can be located at or near the resilient pad 1902, such that the opening formed by the scissors 1904 faces an interior surface of the helmet 1906. It is understood that some embodiments can include combinations of different lever configurations, such as alternate-facing scissor assemblies 1904—one facing towards the user's head, another facing away from the user's head.

In the illustrative example, opposing ends of adjacent pairs of scissor assemblies 1904 abut the interior surface of the helmet 1906. In at least some embodiments, the scissor assemblies 1904 include a relatively low friction mechanism, such as a wheel 1908, a bearing, a ball bearing, a caster, and the like. In at least some embodiments wheels 1908 of the low friction mechanism roll along tracks 1910 or grooves formed along an interior surface of the helmet.

Some configurations can include linkages between one or more of the scissor assemblies and the helmet and/or other scissor assemblies. Linkages can include any of the variants disclosed herein, e.g., including spring linkages, levers, rigid links, pulleys, and the like. Such linkages can include, without limitation, a first suspension assembly 1700 (FIG. 17) and/or a second suspension assembly 1800 (FIG. 18).

In operation, a force applied to one side of the helmet 1906 compresses pairs of scissors 1904 adjacent to a point of impact. The compression of some of the pairs of scissors 1904 urges the resilient pads 1902 inward toward the user's head. A plurality of springs 1912 and/or dampers can be applied along one or more of the pairs of scissors 1904 to facilitate energy transfer in reaction to collisions.

In some embodiments, the suspension system includes multiple arrays of padded scissor assemblies 1904. For example, the arrays 1904 can be provided in respective transverse planes along a central vertical axis. Accordingly, the scissor arrays 1904 can be stacked to provide support over an extended are of a dome of the user's head.

Figure 20:
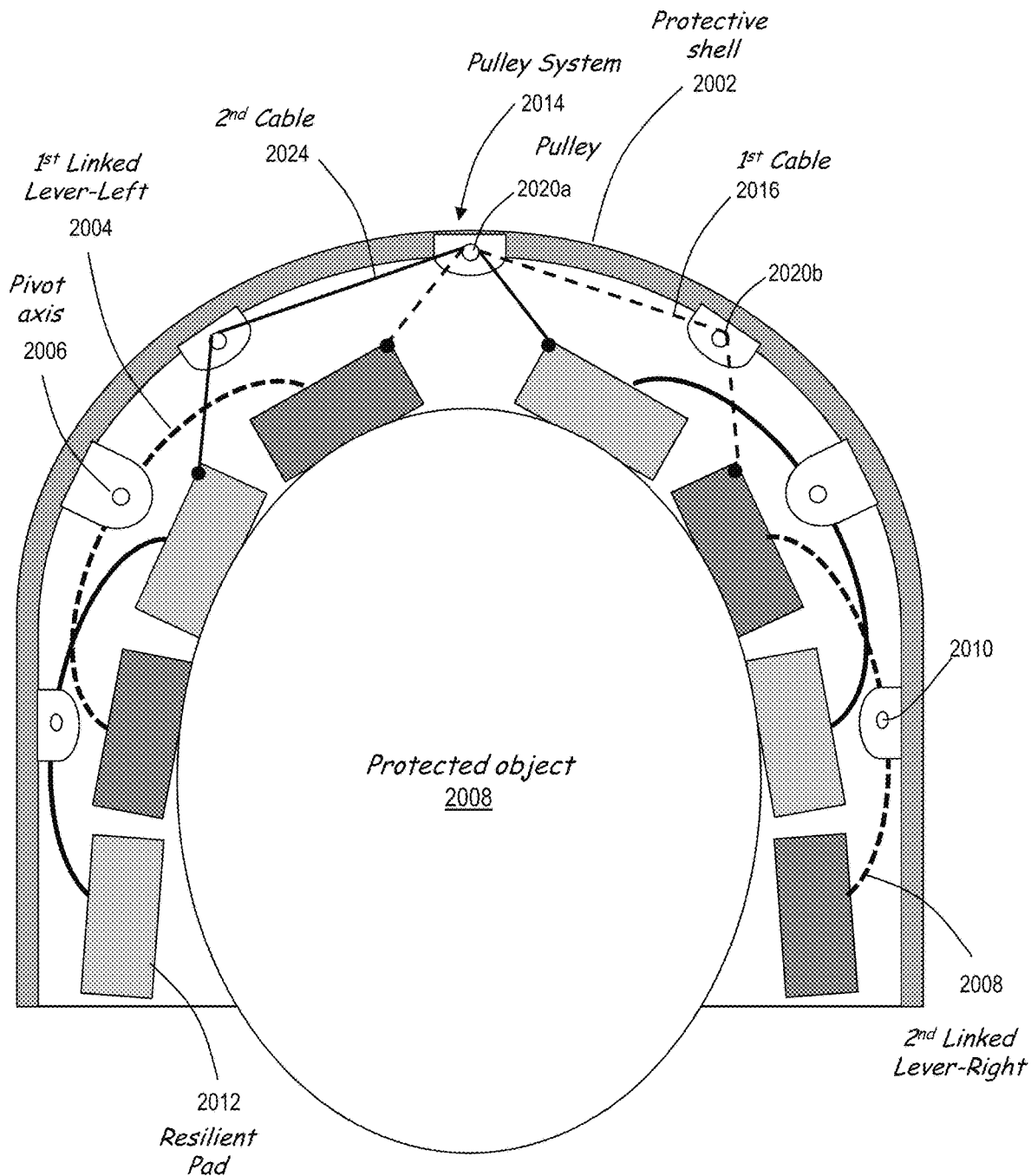
FIG. 20 depicts a cross section view of a helmet including an embodiment of a pulley system.

FIG. 20 depicts a cross section view of a protective shell, e.g., a helmet 2002 including an embodiment of a pulley suspension system 2000. The suspension system 2000 includes a first lever assembly 2004 that rotates about a first pivot axis 2006. At least one end of the lever assembly 2004 is mechanically linked to at least one end of second lever assembly 2008 that rotates about a second pivot axis 2010. Ends of each of the lever assemblies 2004, 2008 can include one or more resilient members, e.g., pads 2012 positioned to engage an adjacent portion of a user's body. In the illustrative embodiment, a mechanically linking of the first and second lever assemblies 2004, 2008 is accomplished by a pulley system. In the illustrative example, a first cable 2016 or wire extends between ends of the first and second lever assemblies 2004, 2008. The first cable 2016 is in communication with at least one pulley 2020a disposed between the first and second levers 2004, 2008. In the illustrative embodiment, the first cable 2016 is in communication with a first pulley 2020a and a second bully 2020b. In at least some embodiments, an arrangement of the first cable 2016 and one or more of the pulleys 2020a, 2020b can provide a mechanical advantage. Alternatively or in addition, numbers and/or placement of the pulleys 2020a, 2020b facilitates rotational responses of one or more of the lever assemblies 2004, 2008.

A force applied to one side of a protective shell 2002, such as a helmet, can result in a rotation of the first lever 2004 about the first pivot 2006. The rotation of the first lever 2004, in turn, applies a tensional force along a first cable 2016 of the pulley system 2014. The force is applied to the second lever 2008 according to the particular pulley configuration, resulting in an induced rotation of the second lever 2008. Rotations of the first and second levers 2004, 2008 apply respective reaction force elements to the user's body by way of the resilient pads 2012 of the levers 2004, 2008. Thus, a first inward force applied along one side of the suspension system 2000 in response to an impact force, induces a second inward force applied along an opposite side of the suspension system 2000. An opposing second system of rotating levers and pads is similarly joined by a second cable 2024 and respond to impact forces in a similar manner, but in opposing directions. In at least some embodiments, multiple pulley systems can be applied along a single baseline, e.g., along a front-to-back and/or along a side-to-side, and/or any direct in between.

Figure 21:
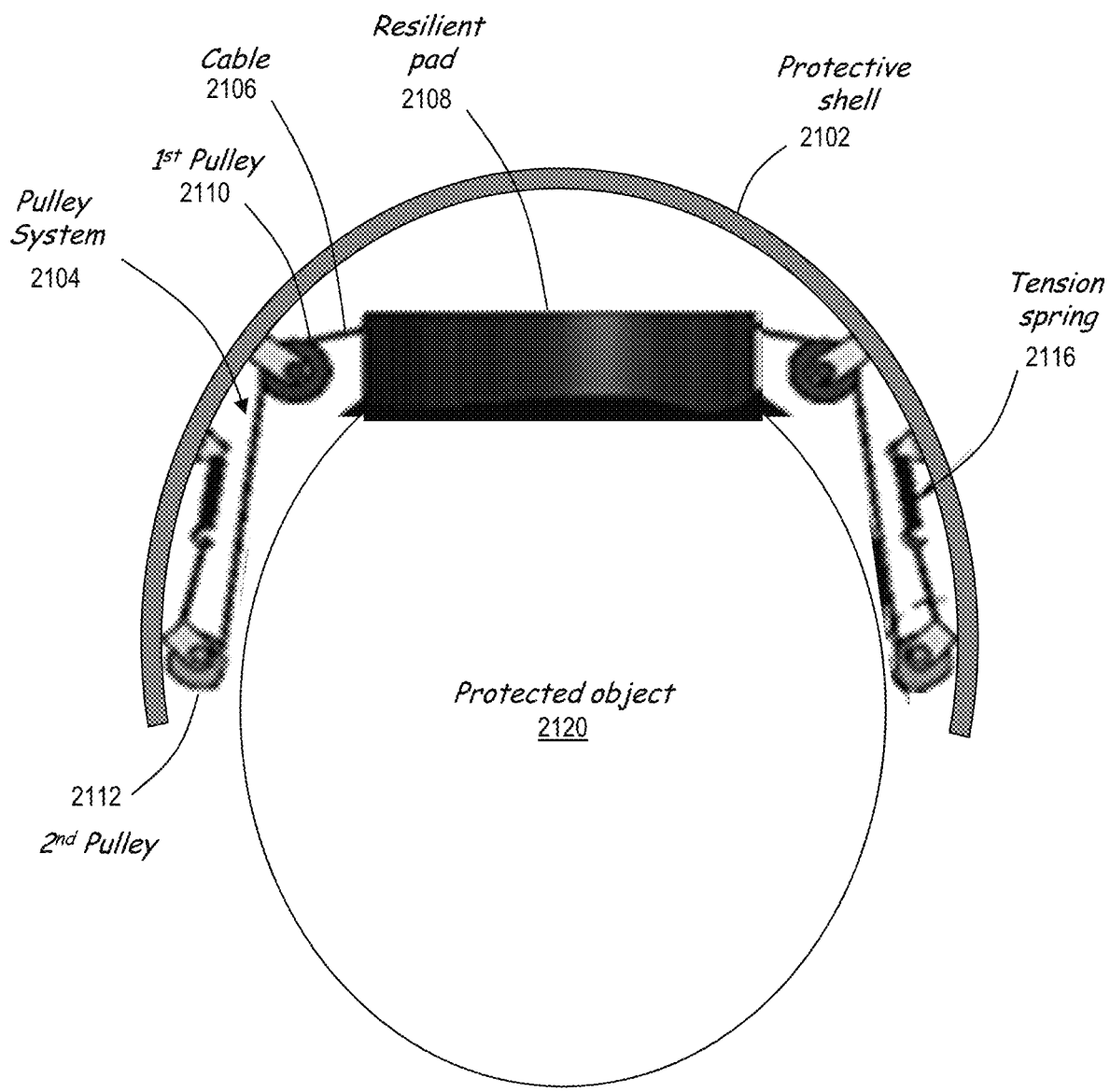
FIG. 21 depicts a front view of an embodiment of a force processing system a helmet system.

FIG. 21 depicts a front view of an embodiment of another example of a force processing system 2100 disposed within a helmet. The force processing system 2100 is attached or otherwise anchored to an interior surface of a protective helmet shell 2102 through a pulley system 2104. The pulley system 2104 includes one or more wires, cables 2106, ropes, strings, and the like, attached between an annular pad 2108 and the helmet by way of respective pulleys 2110. In some embodiments, the pulleys include non-circular pulleys or cams 2112. The cams 2112 are configured to rotate in response to a change in tension along the pulley cable 2106. The pulley cable 2106 can include a resilient or spring member 2116. Beneficially, rotation of the cam 2112 changes a rate of expansion and/or compression of the spring 2116. In such a manner, the suspension system 2104 can provide a variable reactive force based on one or more of the spring 2116, the annular pad 2108, and the cam 2112.

In operation, a vertically downward force applied at a top portion of the helmet 2102 moves the helmet 2102 in a direction towards a top portion of a user's head 2120. In a relative sense, the head 2120 moves upward towards the helmet shell 2102. The relative movement of the head 2120 applies a tension to the pulley cable 2106. The tension rotates the cam 2112 and expands the spring 2116, thereby storing mechanical energy in the spring.

Figure 22A:
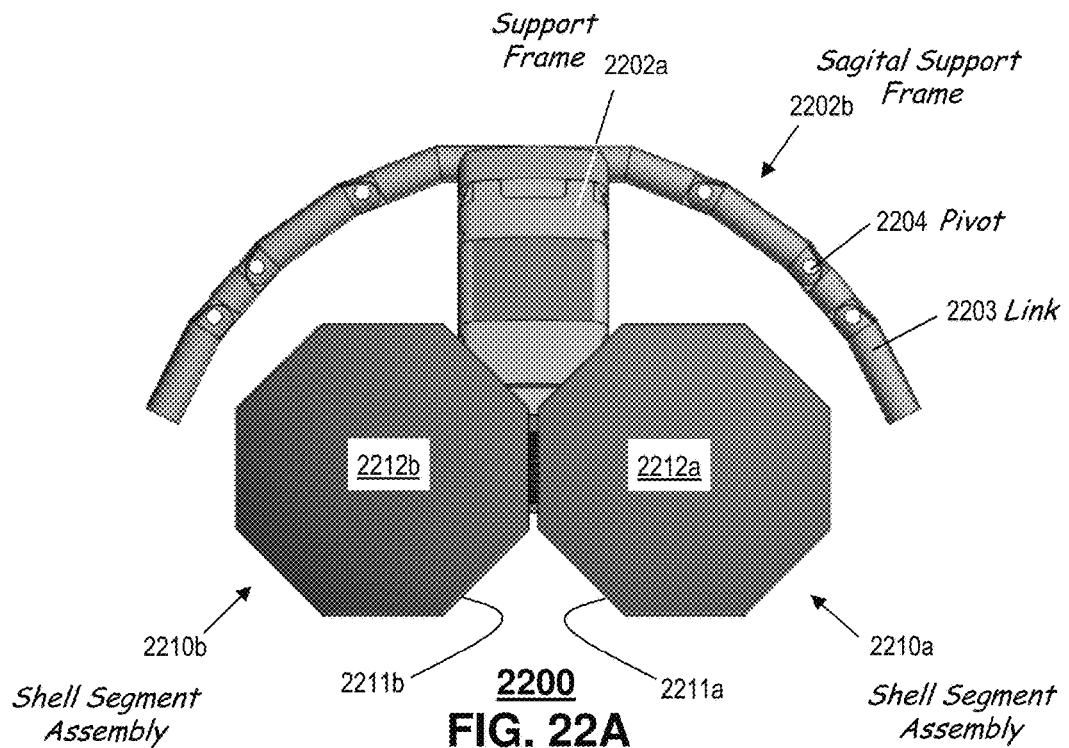
FIGS. 22A and 22B depict front and side views, respectively, of a portion of an example segmented helmet system.
Figure 22B:
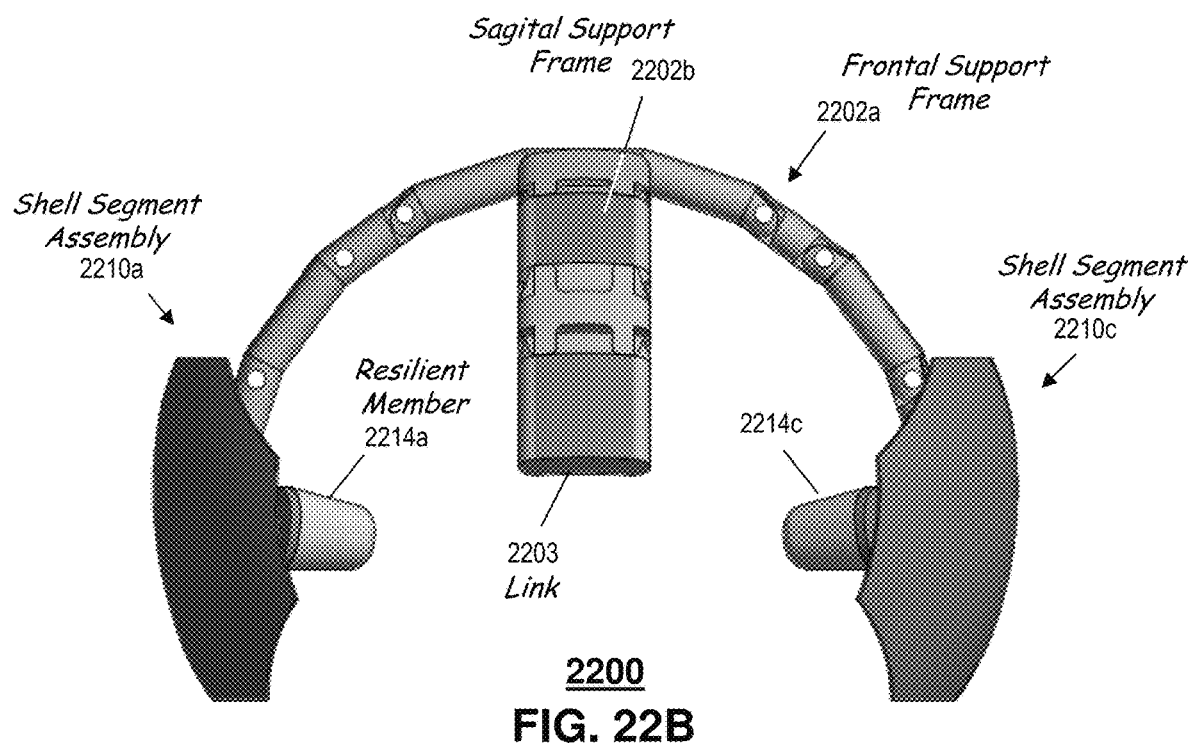

FIGS. 22A and 22B depict front and side views, respectively, of a portion of an example segmented helmet system 2200 that includes one or more machines. The helmet system 2200, when positioned on a portion of a body, facilitates a redistribution of an impact force transferred to the body via a protective member. In particular, the helmet system 2200 includes a segmented protective shell formed from multiple shell segments that are movable with respect to each other. The shell segments are in communication with and/or integrally formed with one or more machines that facilitate a redistribution of a collision force in a controlled manner, e.g., including a controlled movement.

The segmented helmet system 2200 includes a first support frame 2202a and a second support frame 2202b, generally 2202. Each of the support frames 2202 includes multiple links 2203 joined together by one or more pivots 2204 to provide a pivotal engagement between the links 2203. At least some of the links 2203 can be arranged in a linear fashion, e.g., end-to-end, to form one or both of the first and second support frames 2202. The pivotal engagement between links allow the support frame 2202 to bend, contort and/or shape to fit the body. The illustrative example illustrates arc shapes that conform to a top and/or side portion of a user's head.

One or more shell segment assemblies 2210a, 2210b, generally 2210, can be attached to the support frame 2202. Each of the shell segment assemblies 2210a, 2210b can include a respective protective shell segment 2212a, 2212b, generally 2212. The protective shell segments 2212 can be planar, and or contoured, e.g., portions of an ellipsoid, a spheroid, and the like. The protective shell segments 2212 are generally bounded by a perimeter 2211a, 2211b, generally 2211. In some embodiments, at least some of the shapes are identical, or similar, e.g., regular and/or irregular polygons, such as the example octagon shapes. It is understood that perimeters 2211 of adjacent shell segments 2212 can be shaped, sized and/or otherwise configured to provide a predetermined gap width therebetween. The gap width can be controlled to be as narrow as possible to still allow for relative movement between adjacent shell segment assemblies 2210 during use. Alternatively or in addition, at least some of the gaps can be large and/or irregular, e.g., to reduce and/or otherwise minimize coverage area, allow for ventilation, reduce weight, reduce cost, and the like.

Figure 22C:
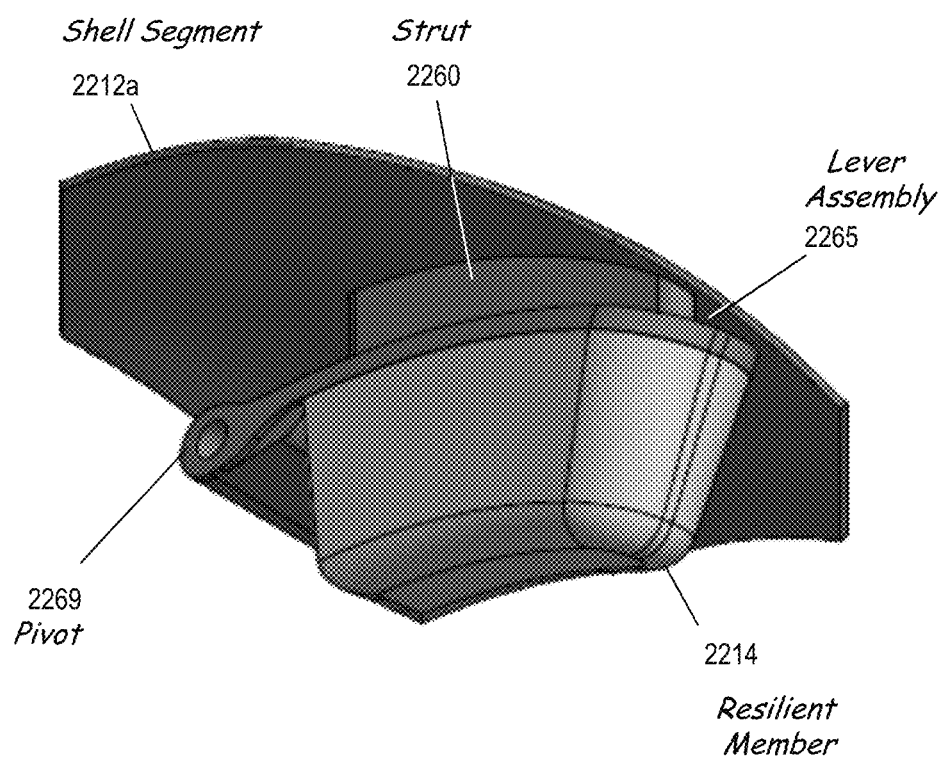
FIG. 22C depicts a bottom perspective view of a segmented shell assembly of the example segmented helmet system depicted in FIGS. 22A-22B.

FIG. 22C depicts a bottom perspective view of one of the segmented shell assemblies 2210a of the example segmented helmet system 2200 depicted in FIGS. 22A-B. In this example, the shell segment 2212a is attached to a portion of a lever assembly 2265. The lever assembly 2265 can include a pivot 2269 to allow for a rotation of the lever assembly 2265 about the pivot point, e.g., during a collision. It is understood that the pivot can include one or more springs and the like. The lever assembly 2265 also includes a resilient member 2214 attached to and/or integrally formed upon a portion of the lever assembly 2265. The lever assembly 2265 can be attached to and/or integrally formed along an interior surface of the shell segment 2212a. In the illustrative embodiment, the lever assembly 2265 is attached to the shell segment 2212b using a mount, e.g., a strut 2260.

It is understood that a segmented shell can be used alone or in combination with any of the various mechanism, frames, helmets, and the like disclosed herein. For example, the shell assembly 2210a can include one or more of a lever, an inclined plane, a wedge, a pulley, a gear, a screw and the like. In some embodiments, one or more of the shell segments 2212 are attached to the machine, and/or to another support structure of a system that includes the machine.

In some embodiments, the shell segments 2212 can be formed by cutting and/or separating sections of a unitary shell. For example, a traditional helmet shell can be injection molded, casted, machined, and the like. The resulting shell can then be cut into segments, e.g., using a saw, a laser, a high energy jet, and the like. Alternatively or in addition, the shell segments 2212 can be formed independently, e.g., individually molded, casted and/or machined.

Beneficially, the various shock abatement systems disclosed herein facilitate mitigation of impact forces by one or more of decelerating a helmet, increasing a reaction distance and/or extending a reaction time based on an impact force. In at least some embodiments, one or more of the deformable components, the mechanically actuated components contribute to a deceleration of a protective system in reaction to an impact, e.g., a collision force. Reaction distances can include one or more of relative distances between a protected item, e.g., a head, and a protective shell, e.g., a helmet. Alternatively or in addition, reaction distances can include one or more of distances traversed by one or more components of the shock abatement systems.

For example, these distances can include displacements based on activation of mechanisms, such as the levers, the pulleys, the screws, the inclined planes, and the like. It is further understood that in at least some embodiments, any of the various configurations of the shock abatement systems disclosed herein can be contained entirely within and/or shielded entirely by the protective shell. Namely, the various shock abatement systems can be entirely housed within a helmet. Although the example shock abatement systems and protective shells disclosed herein include head and/or neck protection systems, it is understood that the same or similar techniques can be applied to other portions of a human body.

The examples disclosed herein refer to systems for use with bodies, such as animal bodies, including human bodies, and/or inanimate objects. Although the example shock abatement systems and protective shells disclosed herein include head and/or neck protection systems, it is understood that the same or similar techniques can be applied to other portions of the body. Moreover, although the examples disclosed herein refer to systems for use with bodies, such as animal, including human bodies, and/or parts of bodies, it is understood that the systems can be used to protect other objects, including inanimate objects.

The helmet system includes a machine that responds to a collision between an external surface of the helmet system and a foreign object, by providing a controlled movement that redistributes energy of the collision. The redistribution of the collision energy results in an absorption and/or dissipation of a non-trivial portion of the collision energy in one or more directions that differ from a direction of the collision, sometimes referred to as a line of impact. The machines can include, without restriction, any of the example mechanisms, machines and/or mechanical systems disclosed herein. In some embodiments, the helmet system includes an assembly of a protective shell and a machine arranged such that the protective shell forms at least a portion of the external surface of the helmet system exposed to the collision. Alternatively or in addition, the assembly of the protective shell and the machine can be arranged such that the machine forms at least a portion of the external surface of the helmet system exposed to the collision. In other embodiments, the helmet system includes a machine that provides the entire exterior surface exposed to the collision. It is understood that in at least some embodiments, at least a portion of the machine can serve as at least a portion of a protective shell.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense. Through application of the various techniques disclosed herein, alone or in combination, it is understood that alternative versions of impact abatement systems can be fashioned or otherwise synthesized. Such syntheses can be based on one or more parameters, such as magnitude of collision forces, thresholds of responses, amounts of deceleration, reconfiguration and/or redistribution of collision forces, and the like.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, by a helmet system including a machine, a collision force along a first direction resulting from kinetic energy of an impact encountered at an external surface of a collision receiving body of the helmet system, to obtain a received collision force, wherein the helmet system, when worn on a head portion, a neck portion, or both of a body, positions the machine in a proximate relationship to the head portion, the neck portion, or both, wherein the machine is attached to the collision receiving body at a force coupler; and
   redistributing, by the helmet system, the received collision force,
      wherein actuation of the machine occurs responsive to the received collision force, wherein the redistributing of the received collision force is based on the actuation of the machine, the actuation comprising:
      mechanically transferring the collision force from the external surface of the collision receiving body to the force coupler;
      mechanically transferring the collision force from the force coupler to the machine;
      mechanically transferring the collision force from the machine to at least one of a shock dampener or a force absorber at an end of the machine;

mechanically transferring the collision force from the least one of the shock dampener or the force absorber to the head portion, the neck portion, or both; and maintaining contact between the at least one of the shock dampener or the force absorber and the head portion, the neck portion, or both before, during, and after the impact, wherein a collision energy transferred to the head portion, the neck portion, or both, resulting from the kinetic energy of the impact is reduced based on the actuation of the machine, and wherein an impact response of the head portion, the neck portion, or both, is reduced based on the actuation of the machine.

2. The method of claim 1, wherein the machine comprises a mechanical advantage, and wherein the redistributing of the received collision force comprises an application of the mechanical advantage of the machine.

3. The method of claim 1, further comprising mechanically transferring the collision force to the at least one of the shock dampener and the force absorber; and mechanically transferring the collision force from the least one of the shock dampener or the force absorber to the head portion, the neck portion, or both.

4. The method of claim 2, wherein the machine comprises a lever, wherein the mechanical advantage is based on a placement of a fulcrum along a length of the lever at a position between opposing ends of the lever, and wherein the redistributing of the received collision force comprises rotating the lever about the fulcrum responsive to the received collision force.

5. The method of claim 1, further comprising reducing a portion of the received collision force transferred toward the head portion, the neck portion, or both, based on the redistributing of the collision force along a second direction, wherein the second direction differs from the first direction, and where no portion of the machine extends below the neck portion of the body.

6. The method of claim 1, wherein the machine is configured to move radially towards the external surface and away from the head portion, the neck portion, or both during the impact.

7. The method of claim 6, wherein the absorbing of the portion of the kinetic energy of the impact comprises transforming the portion of the kinetic energy to a potential energy.

8. The method of claim 6, wherein the absorbing of the portion of the kinetic energy of the impact comprises changing the portion of the kinetic energy to one of a potential energy, a mechanical energy, a thermal energy, an acoustic energy, an electrical energy, a magnetic energy, or any combination thereof.

9. The method of claim 6, wherein the absorbing of the portion of the kinetic energy of the impact comprises deforming of an absorbing member.

10. The method of claim 9, wherein the deforming of the absorbing member comprises a bending of a leaf spring.

11. The method of claim 1, wherein the redistributing of the received collision force comprises one of an application of a portion of the received collision force to an inclined plane, application of a wedge, a pivoting of a lever, an operation of a pulley, a rotating of a gear, turning of a wheel, a sliding of a bearing, a rolling of a bearing, a turning of a screw, a deforming of a spring, a deforming of a material, a displacement of a gas, a displacement of a fluid, a displacement of a gel, and any combination thereof.

12. The method of claim 1, wherein actuation of the machine extends a distance over which the received collision force is applied.

13. The method of claim 1, wherein actuation of the machine extends a time over which the received collision force is applied.

14. The method of claim 1, wherein the machine comprises a plurality of interconnected mechanical links, wherein some mechanical links of the plurality of interconnected mechanical links are pivotably connected to other mechanical links of the plurality of interconnected mechanical links, and wherein the redistributing of the received collision force comprises changing a configuration of the plurality of interconnected mechanical links in response to the received collision force.

15. A method comprising:

receiving, by a helmet system comprising a machine, a collision force along a first direction resulting from kinetic energy of an impact encountered between an external surface of the helmet system and a foreign object, to obtain a received collision force, wherein the helmet system, when worn on a head portion, a neck portion or both of a body, positions the machine in a proximate relationship to the head portion, the neck portion or both, and wherein a collision parameter is based on the received collision force; and selectively actuating the machine based on the collision parameter exceeding kinetic energy threshold, wherein a first portion of the kinetic energy is expended by the actuating of the machine, and wherein the received collision force is redistributed based on the actuation of the machine, wherein:

the machine is attached to the helmet system at a force coupler; and the force coupler is configured to passively reduce the collision force of the impact by mechanically and selectively actuating the machine based on the collision parameter exceeding the kinetic energy threshold.

16. The method of claim 15, wherein the collision parameter comprises one of a separation distance, a position, a force, a torque, a time, a velocity, an acceleration, a momentum, an energy or any combination thereof.

17. A method comprising:

providing a helmet system comprising a machine, wherein the helmet system is wearable upon a head portion, a neck portion, or both of a body when worn, placing the machine in a proximate relationship to the head portion, the neck portion or both, when worn, and configured to receive a collision force along a first direction resulting from kinetic energy of an impact encountered between an external surface of the helmet system and a foreign object, to obtain a received collision force; and selectively actuating the machine based on a collision parameter exceeding a kinetic energy threshold, wherein a first portion of the kinetic energy is expended by the actuating of the machine, and wherein the received collision force is redistributed based on the actuation of the machine, wherein:

the machine is attached to the helmet system at a force coupler; and the force coupler is configured to:

mechanically and selectively actuate the machine based on the collision parameter exceeding the kinetic energy threshold; and passively reduce the collision force exerted on the head portion, the neck portion, or both of the body.

18. The method of claim 17, wherein the collision parameter comprises one of a separation distance, a position, a force, a torque, a time, a velocity, an acceleration, a momentum, an energy or any combination thereof.

19. A method comprising:
providing a helmet system including a machine attached to the helmet system at a force coupler, that when placed on a head portion, a neck portion, or both, of a user, positions the machine in a proximate relationship to the head portion, the neck portion, or both, wherein the helmet system receives a collision force along a first direction resulting from kinetic energy of an impact encountered at an external surface of the helmet system, to obtain a received collision force, wherein the helmet system provides a redistributing of the received collision force from the external surface to the machine through the force coupler, wherein the received collision force induces an actuation of the machine, wherein the redistributing of the received collision force is based on the actuation of the machine, wherein a collision energy transferred to the head portion, the neck portion, or both, resulting from the kinetic energy of the impact is reduced based on the actuation of the machine, and wherein an impact response of the head portion, the neck portion, or both, is reduced base on the actuation of the machine.

20. The method of claim 19, wherein the redistributing of the received collision force comprises reducing a portion of the received collision force transferred toward the head portion, the neck portion, or both, based on the helmet system absorbing a portion of the kinetic energy of the impact at the force coupler, and wherein the absorbing of the portion of the kinetic energy of the impact comprises transforming the portion of the kinetic energy to a potential energy.

\* \* \* \* \*